US005850227A

United States Patent [19]
Longhenry et al.

[11] Patent Number: 5,850,227
[45] Date of Patent: Dec. 15, 1998

[54] BIT MAP STRETCHING USING OPERAND ROUTING AND OPERATION SELECTIVE MULTIMEDIA EXTENSION UNIT

[75] Inventors: Brian E. Longhenry, Cypress; John S. Thayer, Houston, both of Tex.

[73] Assignee: Compaq Computer Corporation, Houston, Tex.

[21] Appl. No.: 771,755

[22] Filed: Dec. 20, 1996

[51] Int. Cl.$^6$ ....................................................... G06F 5/00
[52] U.S. Cl. .......................... 345/439; 345/523; 364/723
[58] Field of Search .................................... 345/439, 428, 345/132, 523, 524, 525, 509; 348/580, 581; 364/723

[56] References Cited

U.S. PATENT DOCUMENTS

| | | | |
|---|---|---|---|
| 5,020,014 | 5/1991 | Miller et al. | 364/723 |
| 5,175,701 | 12/1992 | Newman et al. | 364/723 |
| 5,214,753 | 5/1993 | Lee et al. | 345/425 |
| 5,469,222 | 11/1995 | Sprague | 348/580 |
| 5,598,525 | 1/1997 | Nally et al. | 345/520 |
| 5,627,956 | 5/1997 | Dao, et al. | 345/443 |
| 5,636,153 | 6/1997 | Ikegaya et al. | 364/736 |
| 5,694,345 | 12/1997 | Peterson | 364/723 |
| 5,727,139 | 3/1998 | Owen et al. | 345/439 |
| 5,734,874 | 3/1998 | Van Hook et al. | 345/513 |
| 5,739,867 | 4/1998 | Eglit | 348/581 |
| 5,745,123 | 4/1998 | Rice | 345/439 |
| 5,754,162 | 5/1998 | Cahill, II | 345/127 |
| 5,778,250 | 7/1998 | Dye | 395/800.32 |

OTHER PUBLICATIONS

Goslin, Gregory Ray, Implement DSP functions in FPGAs to reduce cost and boost performance, EDN, Oct. 10, 1996, pp. 155–164.

Kohn, L., et al., The Visual Instruction Set (VIS) in Ultra SPARC™, IEEE (1995), pp. 482–489.

Lee, Ruby B., Realtime MPEG Video via Software Decompression on a PA–RISC Processor, IEEE (1995), pp. 186–192.

Zhou, et al., MPEG Video Decoding with the UltraSPARC Visual Instruction Set, IEEE (1995), pp. 470–474.

Papamichalis, Panos, *An Implementation of FFT, DCT, and other Transforms on the TMS320C30*, (1990), pp. 53–119.

Gwennap, Linley, UltraSPARC Adds Multimedia Instructions, Microprocessor Report, Dec. 5, 1994, pp.16–18.

Programmer's Reference Manual, Intel Architecture MMX™Technology, Chapters 2–5, Intel Corp., printed Sep. 26, 1996.

*Primary Examiner*—Stephen S. Hong
*Attorney, Agent, or Firm*—Pravel, Hewitt & Kimball

[57] ABSTRACT

A routable operand and selectable operation processor multimedia extension unit is employed to stretch pixel bit images in a video system using an efficient, parallel technique. For a series of pixels in a row, a series of interpolation values are established, based on multiples of a reciprocal of a stretch factor. For each interpolation value, the integral portion is used to establish the appropriate two source pixels, and the fractional portion then provides weighting of those pixel values. The various source pixels and interpolation values are routed using the operand routing and operated upon using the vector selectable operations, yielding two destination pixels calculated in parallel.

9 Claims, 11 Drawing Sheets

$(402)\ P'_0 = (1-i_1)P_{I_1} + i_1 P_{I_1+1} = (1-0)P_0 + 0P_1 = P_0$ $(404)\ P'_1 = (1-i_2)P_{I_2} + i_2 P_{I_2+1} = (1-.8)P_0 + .8P_1 = .2P_0 + .8P_1$ $(406)\ P'_2 = (1-i_3)P_{I_3} + i_3 P_{I_3+1} = (1-.6)P_1 + .6P_2 = .4P_1 + .6P_2$

509 — | $I_8, i_8$ | $I_7, i_7$ | $I_6, i_6$ | $I_5, i_5$ | $I_4, i_4$ | $I_3, i_3$ | $I_2, i_2$ | $I_1, i_1$ | ) V1

510 — | $I_4, 0$ | $i_4, 0$ | $I_3, 0$ | $i_3, 0$ | $I_2, 0$ | $i_2, 0$ | $I_1, 0$ | $i_1, 0$ | ) V1

V0 | $P_{I_1+1}, 0$ | $P_{I_1+1}, 0$ | $P_{I_1}, 0$ | $P_{I_1}, 0$ | $P_{I_1}, 0$ |
V2 | $P_{I_2+1}, 0$ | $P_{I_2+1}, 0$ | $P_{I_2}, 0$ | $P_{I_2}, 0$ | $P_{I_2}, 0$ | } 514

$I_n$ = integer portion of interpolation value n
$i_n$ = fractional portion of interpolation value n

BIT MAP STRETCHING USING OPERAND ROUTING AND OPERATION SELECTIVE MULTIMEDIA EXTENSION UNIT

BACKGROUND OF THE INVENTION

1. Field of the Invention

The invention relates to stretching of video bit maps, and more specifically to employing an operand routing and operation selective extension unit to stretch bit maps for video images.

2. Description of the Related Art

The microcomputer industry has seen a metamorphosis in the way computers are used over the last number of years. Originally, most operating systems were text based requiring typed user input and providing textual response. These systems have given way to graphical based environments. Current systems are heavily graphically based, both providing graphical user interfaces including icons, windows, and the like, and providing graphical interaction with a user through a variety of user input devices.

This trend is likely to continue. But graphical, multimedia environments place different and greater demands on processor capabilities than the old textual environments. For many years, the Intel x86 series of processors by Intel Corporation has provided the computing power for IBM PC compatible machines. The architecture of the Intel design, however, is not optimized towards graphical operations.

To this end, a number of extensions to the x86 architecture have been proposed and developed. These include the MMX extensions developed by Intel Corporation. Further, other manufacturers have similarly extended their instruction sets. For example, Sun Microcomputing has developed the UltraSparc, a graphics extension of the SPARC V9 architecture.

Typical vector processors provide for multiple operations simultaneously, but require that the same operation be performed by each partition within the vector (SIMD, or single instruction multiple data). In the multimedia extension unit architecture, this has changed. Not only can multiple operations be concurrently executed on vectorized data, but different operations can be simultaneously performed, and the vectorized data can be rerouted through a number of multiplexers.

This architecture presents a number of possibilities, but developing algorithms that efficiently utilize this architecture places its own demands, given the new features of the instruction set. It is desirable to efficiently utilize this architecture to execute algorithms for multimedia.

SUMMARY OF THE INVENTION

According to the invention, operand routing and selectable operations are used in a multimedia extension unit to perform stretching of a bit map. Two source pixels are simultaneously selected for two destination pixels based on an integer portion of an interpolation value. Further, the next succeeding pixels after the two source pixels are also chosen based on the integer portion of the interpolation value. Then, for each destination pixel, its corresponding source pixel and next succeeding source pixel are weighted by a fractional portion of the interpolation value. These two pixels are then added, yielding an interpolated destination pixel. Further, the first two source pixels are simultaneously weighted, and then the two succeeding source pixels are simultaneously weighted and added to the weighted two original source pixels. This yields two destination pixels using parallel processing. Two subsequent interpolation values are then chosen, and the process is repeated until an entire row of a source bit map is stretched. This can be repeated for all of the rows of a source bit map.

This parallel bit map stretching can be employed by a video or a graphic system in which a bit image is generated, and then a scale factor is determined, such as by window expansion by a user in a graphical interface. Based on this scale factor, the bit map is stretched, and then the stretched bit map is displayed on the screen.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
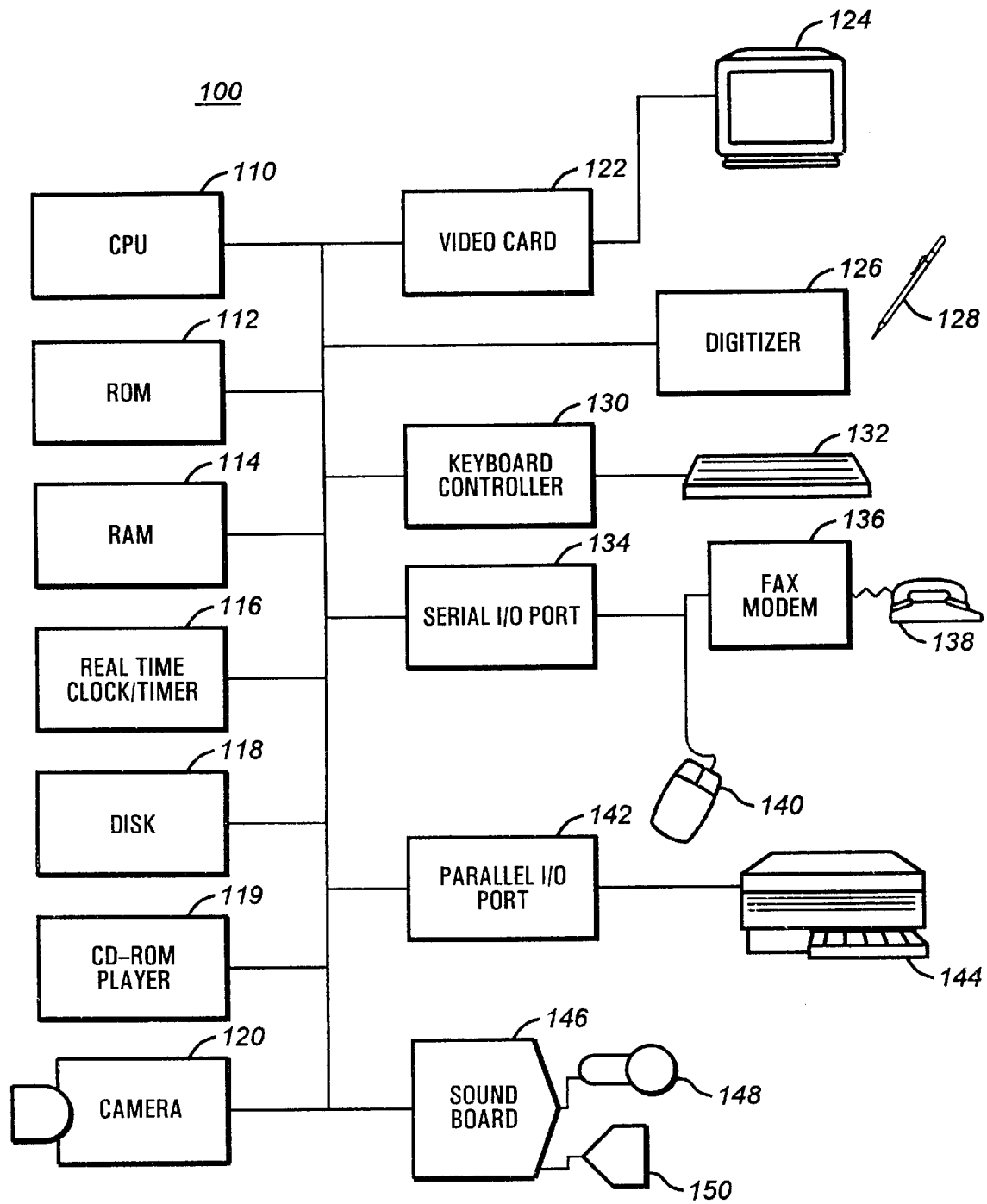
FIG. 1 is a block diagram of a computer system having a processor and a multimedia extension unit of the present invention.
Figure 2:
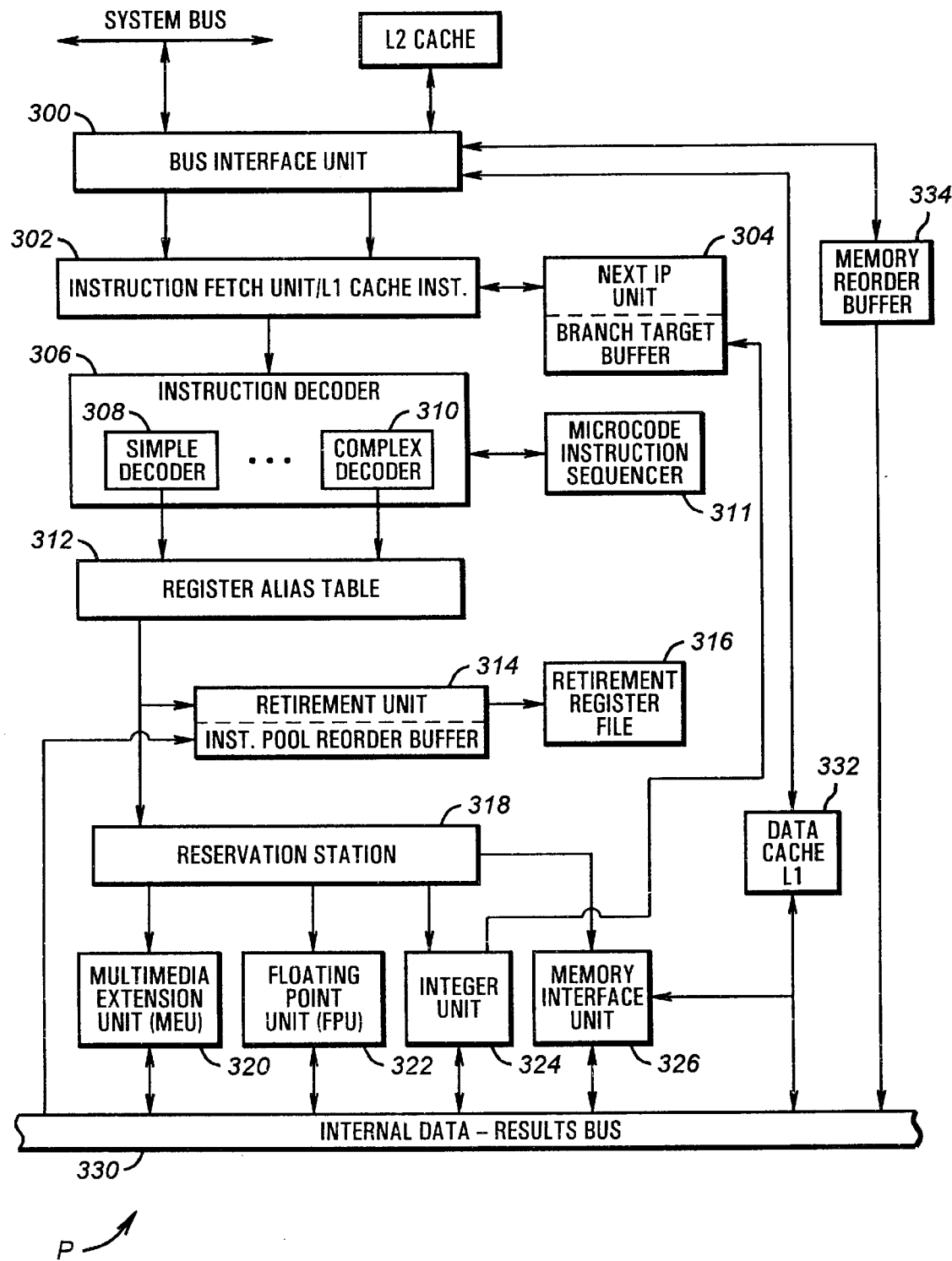
FIG. 2 shows a micro-architecture of the processor and the multimedia enhanced unit of FIG. 1.

Turning now to the drawings, FIG. 1 shows a block diagram of a computer 100. In FIG. 1, a central processing unit (CPU) 110 provides processing power for the computer system 100. The CPU 110 is preferably an Intel Pentium-Pro® processor with an multimedia extension unit (MEU), as shown in FIG. 2. However, a number of other microprocessors suitably equipped with an MEU may be used, including a PowerPC microprocessor, an R4000 microprocessor, a Sparc microprocessor, or an Alpha microprocessor, among others. The CPU 110 is connected to a read only memory (ROM) 112. The ROM 112 provides boot code such as a system BIOS software that boots up the CPU 110 and executes a power up self test (POST) on the computer system 100.

In addition, the CPU 110 is connected to a random access memory (RAM) 114. The RAM 114 allows the CPU 110 to buffer instructions as well as data in its buffer while the computer 100 is in operation. The RAM 114 is preferably a dynamic RAM array with 32 megabytes of memory. The CPU 110 is also connected to a real time clock and timer 116. The real time clock and timer 116 stores the dates and time information for the CPU 110. Furthermore, the real time clock and timer 116 has a lithium backup battery to maintain the time information even when the computer system 100 is turned off.

The CPU 110 is also connected to a disk storage device 118. The disk storage device 118 stores executable code as well as data to be provided to the CPU 110. Additionally, the CPU 110 is connected to a CD-ROM drive. Typically, an IBM PC compatible computer controls the disk drive 118 and the CD-ROM player 119 via an Intelligent Drive Electronics (IDE) interface.

Additionally, the CPU 110 is connected to a camera 120. The camera 120 supports video conferencing between the user and other users. The camera 120 essentially consists of a lens, a charge-coupled-device (CCD) array, and an analog to digital converter. The lens focuses light onto the CCD array, which generates voltages proportional to the light. The analog voltages generated by the CCD array are converted into a digital form by the analog to digital converter for processing by the CPU 110.

The CPU 110 is also connected to a video card 122. On the back of the video card 122 are one or more jacks. Connectors for monitors can be plugged into the jacks. The connectors, which are adapted to be plugged into the jacks of the video card 122, eventually are connected to the input of a monitor 124 for display.

A pen-based user interface is also provided. A digitizer 126 is connected to the CPU 110 and is adapted to capture user input. Additionally, a pen 128 is provided to allow the user to operate the computer. The pen 128 and digitizer 126 in combination supports another mode of data entry in addition to a keyboard 132.

While the video monitor 124 receives the output signals from the CPU 110 to the user, the keyboard 132 is connected to a keyboard controller 130 for providing input information to the CPU 110. Additionally, one or more serial input/output (I/O) ports 134 are provided in the computer system 100. Connected to the serial I/O ports 134 are a plurality of peripherals, including a mouse 140 and a facsimile modem 136. The facsimile modem 136 in turn is connected to a telephone unit 138 for connection to an Internet service provider 90, for example. Preferably, the modem 136 is a 28.8 kilobits per second modem (or greater) that converts information from the computer into analog signals transmitted by ordinary phone lines or plain old telephone service (POTS). Alternatively, the modem 136 could connect via an integrated service digital network (ISDN) line to transfer data at higher speeds.

Furthermore, a parallel input/output (I/O) port 142 is provided to link to other peripherals. Connected to the parallel I/O port 142 is a laser printer 144. Additionally, a microphone 148 is connected to a sound board 146 which eventually provides input to the CPU 110 for immediate processing or to a disk drive 118 for offline storage. The sound board 146 also drives a music quality speaker 150 to support the multimedia-based software. As multimedia programs use several medium, the multimedia computer system of the present invention integrates the hardware of the computer system 100 of the present invention. For example, the sound board 146 is used for sound, the monitor 124 is used to display movies and the CD-ROM player 119 is used for audio or video. In this manner, sounds, animations, and video clips are coordinated to make the computer session more friendly, usable and interesting.

Turning now to FIG. 2, a functional block diagram of the processor microarchitecture employed by the present invention is shown. The processor of the present invention is preferably based on an Intel-compatible Pentium-Pro microprocessor. The mode employed by the present invention is in addition to the existing modes of the 486 and Pentium processors, and unless otherwise indicated, the operation and features of the processors remain unchanged. Familiarity with the operation of the 486, Pentium and Pentium Pro are assumed in this description. For additional details, reference should be made to the appropriate data book. However, the invention could also be used in earlier processor generations such as the Intel Pentium™, 80486™, 80386™, 80286™, and 8086™ microprocessors. The use of the features of the multimedia extension unit could also be used with other types of microprocessors, including without limitation, the Power PC architecture, the Sparc architecture, and the MIPS R4000 architecture. For purposes of this disclosure, the terms microprocessor and processor can be used interchangeably.

In FIG. 2, the processor P employed by the present invention interacts with the system bus and the Level 2 cache (not shown) via a bus interface unit 300. The bus interface unit 300 accesses system memory through the external system bus. Preferably, the bus interface unit is a transaction oriented 64-bit bus such that each bus access handles a separate request and response operation. Thus, while the bus interface unit 300 is waiting for a response to one bus request, it can issue additional requests. The interaction with the Level 2 cache via the bus interface unit 300 is also transaction oriented. The bus interface unit 300 is connected to a combination instruction fetch unit and a Level 1 instruction cache 302. The instruction fetch unit of the combination unit 302 fetches a 32-byte cache line per clock from the instruction cache in the combination unit 302. The combination unit 302 is also connected to an instruction pointer unit and branch target buffer combination 304. The branch target buffer in turn receives exception/interrupt status and branch misprediction indications from an integer execution unit 324, as discussed below.

Additionally, the instruction fetch unit/L1cache combination 302 is connected to an instruction decoder 306. The instruction decoder 306 contains one or more simple decoders 308 and one or more complex decoders 310. Each of decoders 308 and 310 converts an instruction into one or more micro-operations ("micro-ops"). Micro-operations are primitive instructions that are executed by the processor's execution unit. Each of the micro-operations contains two logical sources and one logical destination per micro-operation.

The processor P has a plurality of general purpose internal registers which are used for actual computation, which can be either integer or floating point in nature. To allocate the internal registers, the queued micro-ops from the instruction decoder 306 are sent to a register alias table unit 312 where references to the logical register of the processor P are converted into internal physical register references.

Subsequently, allocators in the register alias table unit 312 add status bits and flags to the micro-ops to prepare them for out of order execution and sends the resulting micro-ops to an instruction pool 314.

The instruction pool 314 is also connected to a reservation station 318. The reservation station 318 also receives the output of the register alias table 312. The reservation station 318 handles the scheduling and dispatching of micro-ops from the instruction pool 314. The reservation station 318 supports classic out-of-order execution where micro-ops are dispatched to the execution unit strictly according to data flow constraints and execution resource availability to optimize performance.

The reservation station 318 is in turn connected to a plurality of execution units, including a multimedia extension unit (MEU) 320, a floating point unit (FPU) 322, an integer unit (IU) 324, and a memory interface unit (MIU) 326. The MEU 320, FPU 322, IU 324 and MIU 326 are in turn connected to an internal data-results bus 330. The internal data-results bus 330 is also connected to the instruction pool 314, a Level 1 data cache 332 and a memory reorder buffer 334. Furthermore, the Level 1 data cache 332 and the memory reorder buffer 334 are connected to the bus interface unit 300 for receiving multiple memory requests via the transaction oriented bus interface unit 300. The memory reorder buffer 334 functions as a scheduling and dispatch station to track all memory requests and is able to reorder some requests to prevent data blockage and to improve throughput.

Turning now to the execution units, the memory interface unit 326 handles load and store micro-ops. Preferably, the memory interface unit 326 has two ports, allowing it to process the address on a data micro-op in parallel. In this manner, both a load and a store can be performed in one clock cycle. The integer unit 324 is an arithmetic logic unit (ALU) with an ability to detect branch mispredictions. The floating point execution units 322 are similar to those found in the Pentium processor. From an abstract architectural view, the FPU 322 is a coprocessor that operates in parallel with the integer unit 324. The FPU 322 receives its instruction from the same instruction decoder and sequencer as the integer unit 324 and shares the system bus with the integer unit 324. Other than these connections, the integer unit 324 and the floating point unit 322 operate independently and in parallel.

In the preferred embodiment, the FPU 322 data registers consist of eight 80-bit registers. Values are stored in these registers in the extended real format. The FPU 322 instructions treat the eight FPU 322 data registers as a register stack. All addressing of the data registers is relative to the register on top of the stack. The register number of the current top of stack register is stored in the top. Load operations decrement the top by one and load a value into the new top of stack register, and store operations store the value from the current top register in memory and then increment top by one. Thus, for the FPU 322, a load operation is equivalent to a push and a store operation is equivalent to a pop in the conventional stack.

Referring now to the multimedia extension unit (MEU) 320, the MEU 320 enhances the instruction set to include vector instructions, partitioned instructions operating on small data elements, saturating arithmetic, fixed binary point data, data scaling support, multimedia oriented ALU functions, and flexible operand routing. To preserve compatibility and minimize the hardware/software impact, the MBU 320 uses the same registers as the FPU 322. When new multimedia instructions are executed on the MEU 320, the registers of the FPU 322 are accessed in pairs. As the FPU 322 registers each have 80 bits of data, the pairing of the FPU 322 registers effectively creates four 160-bit wide registers, as further discussed below. Furthermore, the MEU 320 adds newly defined instructions which treat registers as vectors of small fixed point data values rather than large floating point numbers. Since the operating system saves the entire state of the FPU 322 as necessary during context switches, the operating system needs not be aware of the new functionality provided by the MEU 320 of the present invention. Although the disclosed system contemplates that the MEU 320 and the FPU 322 share logic or registers, the processor P could simply have snooping logic that maintains coherency between register values in completely separate MEU 320 and FPU 322 sections.

With respect to status and control bits, the FPU 322 has three registers for status and control: status word, control word, and tag word. These FPU 322 registers contain bits for exception flags, exception masks, condition codes, precision control, routing control and stack packs. The MEU 320 does not use or modify any of these bits except for the stack pack bits, which is modified because the MBU 320 result values are often not valid floating point numbers. Thus, anytime a MEU instruction is executed, the entire FPU tag word is set to 0xfffh, marking all FPU 322 registers as empty. In addition, the top of stack pointer in the FPU 322 status words (bits 11–13) is set to 0 to indicate an empty stack. Thus, any MEU 320 instruction effectively destroys any floating point values that may have been in the FPU 322. As the operating system saves and restores the complete FPU state for each task, the destruction of floating point values in the FPU 322 is not a problem between tasks. However, appropriate software action may need to be taken within a single task to prevent errors arising from modifications to the FPU 322 registers.

The sharing of the registers of the FPU 322 and the MEU 320 avoids adding any new software visible context, as the MEU 320 does not define any new processor status, control or condition code bits other than a global MEU extension enable bit. Furthermore, the MEU 320 can execute concurrently with existing instructions on the registers of the integer unit 324. Therefore, the CPU 110 logic is well utilized as the MEU 320 is efficiently dedicated to signal processing applications while the FPU 322 is dedicated to floating point intensive applications and the integer unit 324 handles addressing calculations and program flow control. Additionally, the MEU 320 allows for scalability and modularity, as the MEU 320 does not change the integer or load/store units. Thereby, the CPU 110 core design is not impacted when the MEU 320 is included or excluded from the processor P.

Figure 3:
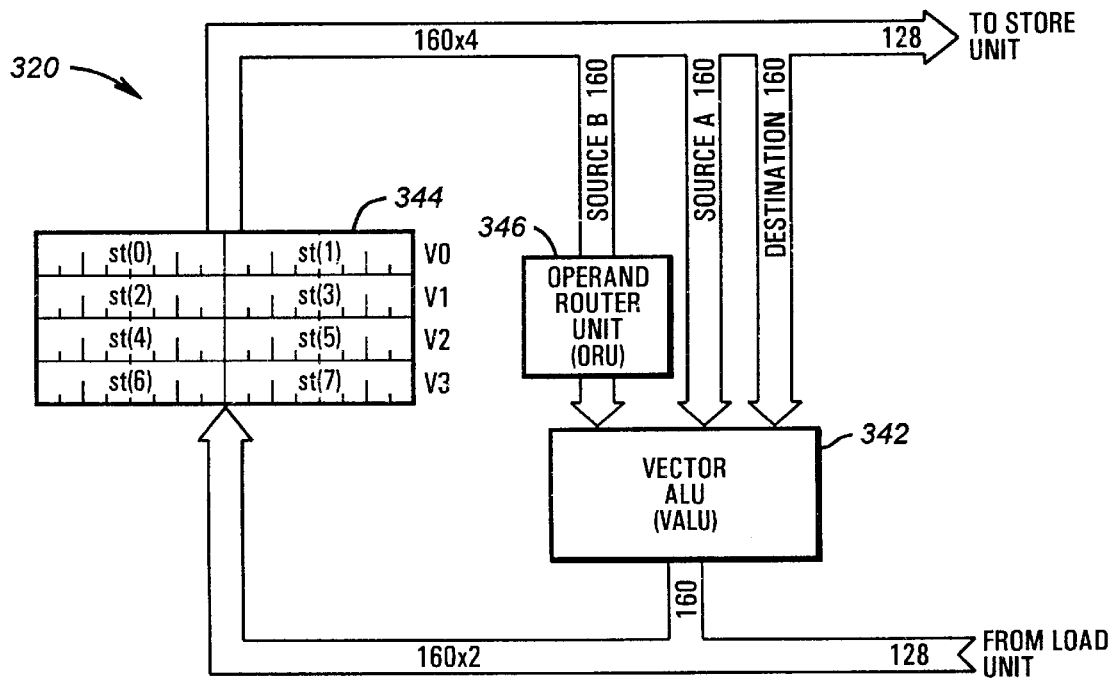
FIG. 3 is a more detailed block diagram of the multimedia extension unit of FIG. 2.

Referring now to FIG. 3, a more detailed block diagram of the MEU 320 is shown. The MEU 320 contains a vector arithmetic logic unit (VALU) 342. The VALU 342 is in turn connected to a plurality of vector registers 344, preferably four. These vector registers are preferably the same registers as those present in the FPU 322.

In the MEU 320, the FPU registers 344 are accessed in pairs. As each of the FPU 322 registers is 80 bits in width, the pairing of the FPU 322 registers effectively creates four 160-bit wide vector registers 344. Thus, as shown in FIG. 3, the register pairs of the FPU 322 are referred to as V0, V1, V2 and V3 and correspond to the physical FPU 332 registers. For instance, FPU 322 physical register 0 is the same as the lower half of the MEU 320 vector register V0. Similarly, FPU 322 physical register 1 is the same as the upper half of MBU 320 vector register V0, while the FPU 322 physical register 7 is register V3. Furthermore the MEU 320 vector register V3. Furthermore, in the MEU 320 of FIG. 3, the stack based access model of the 80×87 floating point instructions is not utilized. Instead, the 160-bit registers V0–V3 are partitioned to form vectors of 10-bit or 20-bit data elements.

The output of the vector registers 344 are subsequently provided to an operand router unit (ORU) 346 and the VALU 342. Each vector instruction controls both the ORU 346 and the VALU 342. In combination, the ORU 346 and the VALU 342 allows the processor P to simultaneously execute software using flexible operand routing and multiple operation. Referring to the flow graph of FIG. 15, for example, the VALU 342 operates on the nodes and the ORU 346 implements diagonal interconnections. Thus, because vector arithmetic of different types and data movement can be processed in groups simultaneously, the VALU 342 and the ORU 346 provide high performance.

The VALU 342 can perform a variety of operations, including addition, subtraction, multiply, multiply/accumulate, shifting and logical functions. The VALU 342 assumes that each of the 160-bit registers 344 is partitioned into 10-bit or 20-bit source operands and destinations. Thus, the VALU 342 can execute 8 or 16 individual operations per instruction. A three-operand instruction format is supported by the VALU 342: source A, source B, and destination registers for each instruction. Additionally, certain operations, such as multiply/accumulate use the destination as an implied third source operand.

The MEU 320 operates primarily in fixed point operation. The difference between fixed point and integer data is the location of the binary point. In the MEU 320, the binary point is assumed to be to the left of the most significant bit. Numbers in the MEU 320 can be considered as fractions that nominally occupy the range from plus 1 to minus 1. The advantage of this format over the integer format is that the numerical magnitude of the data does not grow with each multiply operation as the product of two numbers in the plus 1 to minus 1 ranges yields another number in the plus 1 to the minus 1 range. Therefore, it is less likely the data will need to be rescaled.

The MEU 320 takes advantage of the full 80-bit width of the FPU 322 register set. The MEU 320 loads data from memory in 8-bit or 16-bit quantities, but the data is expanded to 10 bits or 20 bits as it is placed into the vector registers 344 (V0 . . . V3). The extended provision provides two benefits: (1) simplifying support for signed and unsigned data, and (2) helping to avoid overflow conditions and round-off errors on intermediate results.

Furthermore, the VALU 342 performs all arithmetic operations using saturating arithmetic. Saturating arithmetic differs from the more familiar modular arithmetic when overflows occur. In modular arithmetic, a positive value that is too large to fit into destination wraps around and becomes very small in value. However, in saturating arithmetic, the maximum representable positive value is substituted for the oversized positive value. This operation is often called clipping.

Additionally, the VALU 342 performs adds, subtracts and Boolean operations on 10-bit to 20-bit quantities. If the result of an add or subtract is outside of the representable range, the result is clipped to the largest positive or negative representable value. However, Boolean operations are not clipped. Furthermore, the result of the add, subtract, and move operations may optionally be shifted right by one bit before being stored to the destination. This scaling can be used to compensate for the tendency of data magnitude to grow with each add or subtract operation. Multiply operations take two 10-bit or 20-bit signed factors and generate a 19-bit or 39-bit signed product. The least significant 9 or 19 bits of the product are rounded and dropped before stored into the 10-bit or 20-bit destination register. As simple multiply operations typically do not overflow, they do not need to be clipped. However, multiply/accumulate operations do require clipping.

Figure 4:
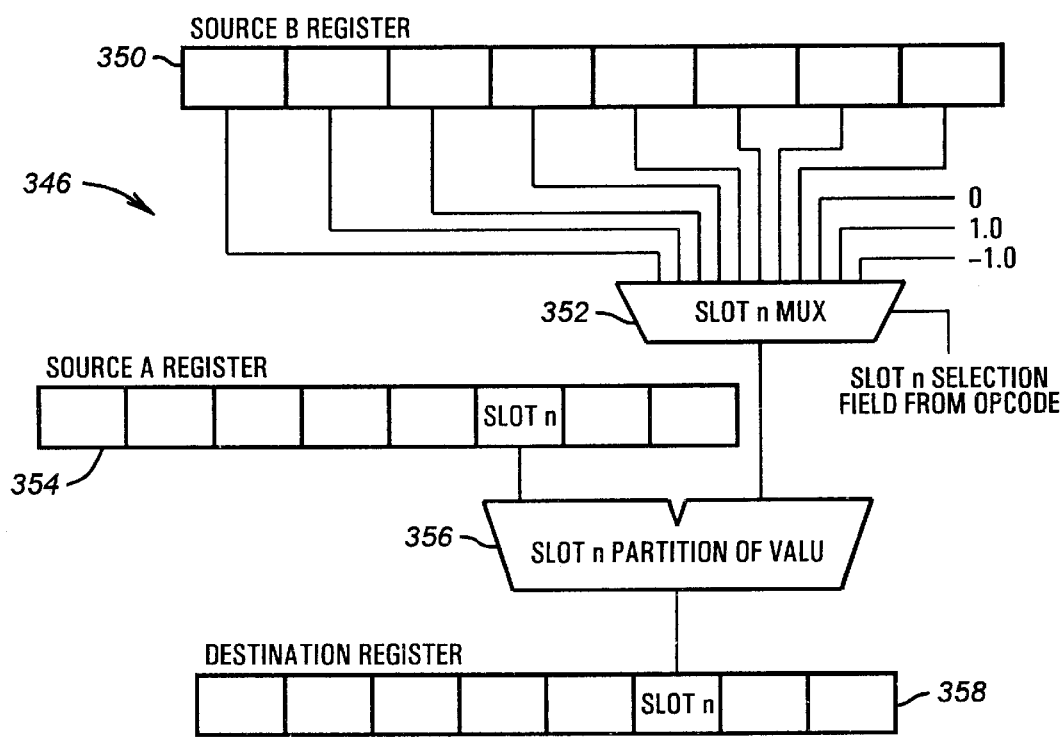
FIG. 4 shows in more detail an operand router unit of FIG. 3.

Turning now to FIG. 4, the details of the operand routing unit 346 are shown. The ORU 346 allows operands to be flexibly moved within and between large 160-bit registers. As vector processors generally must load data from memory in large monolithic chunks, the ability to route operands is useful for the MEU 320. The ability to flexibly access and route individual operands, the ORU 346 provides the ability to "swizzle" the data partitions in a vector register as data moves through it. The swizzling operation allows the operands to be shuffled as needed by the application concurrently with the execution of the vector ALU operations. Thus, a smaller amount of data is required to yield useful results. Thus, the load and store units are less likely to be overloaded, leaving greater bandwidth for the integer, non-vector units to perform work.

As shown in FIG. 4, the ORU 346 is essentially an enhanced 8×8 crossbar switch which works with a plurality of slots. In the preferred embodiment, eight slots are provided for each of a source B register 350, source A register 354 and a destination register 358. The source B register 350 is connected to a multiplexer 352. The output of the multiplexer 352 and the source A register 354 is provided to a VALU partition 356. The VALU partition 356 in turn is connected to the destination register 358.

In the vector source B register 350, each slot contains either one 20-bit partition or two 10-bit partitions, depending on the partition width as specified in the vector instruction. For 10-bit partitions, the MEU 320 simultaneously performs independent but identical operations on the two partitions in a slot. Furthermore, each slot in the destination register 358 can independently receive one of eleven values: the value in one of the eight source slots 350 and 354, a Z value (0), a P value (1) or an N value (−1). During the execution of codes by the MEU 320, all vector instructions use a single opcode format that simultaneously controls the VALU 342 and the ORU 346. This format is approximately eight bytes long. Each instruction encodes the two source registers, the destination register, the partition size, and the operations to be performed on each partition. In addition, each instruction encodes the ORU 346 routing settings for each of the eight slots. Normally, any two of the vector operations defined in the following table may be specified in a single vector instruction. Each slot can be arbitrarily assigned either of the two operations. The vector instructions offered by the MEU 320 is shown in Tables 1 and 2, as follows:

TABLE 1

Vector Operation Descriptions

| Category | Mnemonic | | Description |
|---|---|---|---|
| Add | add | add_ | Add sourceA and sourceB partitions, place sum in destination. add_ arithmetically shifts the result right by one bit (computes average). |
| Subtract | sub | sub_ | Subtract partitions. sub does sourceA - source B; sbr does source B - |
|  | sbr | sbr_ | source A. sub_ and sbr_ arithmetically shift the result right by one bit. |
| Accumulate/ | acum | acum_ | Add the contents of the destination register partition to the sourceB |

TABLE 1-continued

Vector Operation Descriptions

| Category | Mnemonic | | | Description |
|---|---|---|---|---|
| Merge | | | | partition and place the sum in the destination. acum_ arithmetically shift the result right by one bit. |
| Negate | neg | | | Negate sourceB partition and place in destination. |
| Distance | dist | | | Subtract partitions then perform absolute value. |
| Multiply | mul | | | mul multiplies the sourceA partition by the sourceB partition and places |
| | mac | | | the product in the destination. mac multiplies sourceA by source B and adds the product to the destination. |
| Conditional | mvz | mvnz | | Conditionally move partition in sourceB register to partition in |
| Move | mvgez | mvlz | | destination register depending on sourceA partition's relationship to zero. |
| Scale | asr | n | | Arithmetically shifts the operand in sourceB by amount n. N can be |
| | asl | n | | between 1 and 4 inclusive. asl uses saturating arithmetic and shifts zeros in from the right. asr copies the sign bit from the left. |
| Logical | lsr | n | | Logically shifts the operand in sourceB by amount n. N can be between |
| Shift | lsl | n | | 1 and 4 inclusive. Zeros are shifted in from the left or right. lsl uses modulo arithmetic; it does not clip. |
| Boolean | false | nor | bnota | Perform one of sixteen possible Boolean operations between sourceA |
| | nota | anotb | notb | and sourceB partitions. (The operations are listed in order of their |
| | xor | nand | and | canonical truth table representations.) |
| | nxor | b | borna | |
| | a | aornb | or | |
| | true | | | |
| Round | rnd | n | | Add the constant (1 *LSb<<n–1) to sourceB, then zero out the n lowest bits. n can be between 1 and 4 inclusive. Implements "round-to-even" method: If (sourceB<n:0> == 010 . . . 0), then don't do the add. |
| Magnitude Check | mag | | | This operation can be used to implement block floating point algorithms. If the number in sourceB has fewer consecutive leading 1's or 0's than the number in sourceA, then sourceB is placed in the destination; otherwise sourceA is placed in the destination. Only the eight leftmost bits of the values are used in the comparison; if both sourceA and sourceB start with a run of more than 7 bits, then the result is the value from sourceA. This operation is an approximation of the "C" statement: (abs(sourceA) <= abs(sourceB)) ? sourceA:source B. |
| SourceA Partition Shift | pshra | | | For each slot s, copy the contents of slot s+1 from the sourceA register to slot s in the destination register. (If this operation is used in slot 7, then the result is immediate zero). This operation can be used to efficiently shift data inputs and outputs during convolutions (FIR filters, etc.). |
| Slot Routing | blbh | | | These operations are defined only for 20-bit partitions. They are used to |
| | ahbh | | | route 10-bit data across the even/odd "boundary" that the ORU doesn't |
| | albl | | | cross. blbh swaps the upper and lower halves of the sourceB operand and places the result in the destination. ahbh concatenates the upper half of the sourceA with the upper half of sourceB. albl concatenates the lower half of sourceA with the lower half of sourceB. |
| Store Conversion | ws2u | | | This operation is used prior to storing 16-bit unsigned data from a 20-bit partition. If bit 19 of sourceB is set, the destination is set to zero. Otherwise, this operation is the same as lsl 1. |
| Extended-Precision | emach | | | These operations are used to perform multiply-and-accumulate functions |
| | emacl | | | while retaining 36 bits of precision in intermediate results; they are only |
| | emaci | | | defined for 20-bit partitions. emach is the same as mac, except that no |
| | carry | | | rounding is done on the LSb. emacl multiplies sourceA and sourceB, then adds bits <18:3> of the 39-bit intermediate product to bits <15:0> of the destination, propagating carries through bit 19 of the destination. emaci is similar to emacl, except that bits <19:16> of the destination are cleared prior to the summation. The carry operation logically shifts sourceB right by 16 bits, then adds the result to SourceA. |

TABLE 2

Operation Synonyms

| Category | Alias Name | Actual Operation | Description |
|---|---|---|---|
| Move SourceB | mov | b | Move the sourceB register partition to the destination |
| | mov_ | asrl | partition. mov_ arithmetically shifts the results right by one bit. |
| Move SourceA | mova | a | Copy the partition in sourceA to the destination. |
| SourceA Absolute | absa | dist (. . . Z . . .) | Compute the absolute value of the sourceA partition. |
| Value Unmodified Destination | dest | acum (. . . Z . . .) | Leave the destination partition unchanged. |
| Average | avg | add_ | Compute average of two values. |

Turning now to load and store instructions, each type of operation has two versions: one that moves 16 bytes of memory and one that moves 8 bytes of memory. The 8-bytes versions are defined because this is often the amount of data needed; loading or storing 16 bytes in these cases would be wasteful. Further, the 8-byte loads and stores can be used to convert between byte-precision data and word-precision data. The 16-byte loads and stores operate on the entire 160-bit vector register. The 8-byte stores for 20-bit partitions store only the values from slots 4 through 7. The 8-byte stores for 10-bit partitions store only the upper half of each of the eight slots. The 8-byte loads for 20-bit partitions load the memory data to slots 4 through 7; slots 0 through 3 are set to zero. The 8-byte loads for 10-bit partitions load the memory data to the upper half of each slot; the lower half of each slot is set to zero. Even though 8-byte loads only copy memory to half of the bits in a vector register, the entire 160-bit vector register is updated by padding the unused partitions with zeros. This feature greatly simplifies the implementation of register renaming for the MEU because partial register updates do not occur. Table 3 illustrates the load and store instructions in more detail:

dest.1 ←=—sourceA.1+#−1.0
dest.0 ←=sourceA.0+sourceB.2

Figures 5, 8:
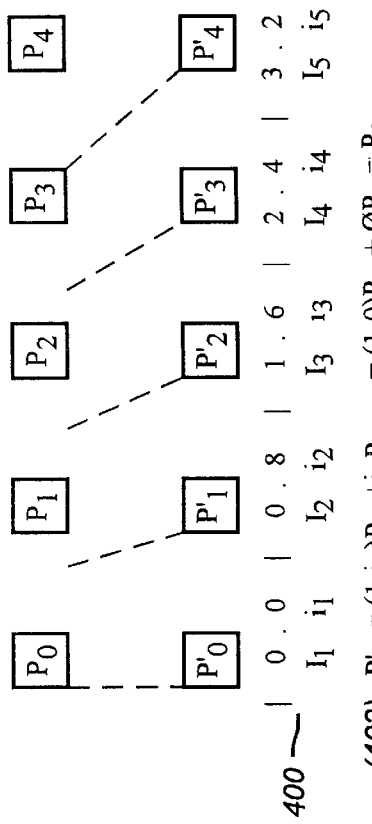
FIG. 5 is a diagram illustrating the technique of pixel weighing to yield a stretched pixel map according to the invention.
FIG. 8 is a table illustrating the contents of certain registers at certain points in execution of the routine of FIG. 6.

Turning to FIG. 5, a graphical representation of the operation of the stretch bit algorithm according to the invention is shown. Illustrated are a series of source pixels represented by $P_0 \ldots P_4$. These are to be mapped to destination pixels $P_0' \ldots P_4'$. In the illustration of FIG. 5, it is assumed that the scale factor is 1.25 times; that is, the resulting image is to be 125 percent of the size of the original image.

Given a bit mapped image with pixels $P_0 \ldots P_4$, it is necessary to interpolate between source pixels to calculate the value of a particular destination pixel. In the discussion that follows, it is assumed that the pixels are 32 bit pixels with three color values plus alpha that can be interpolated through weighing and addition.

To perform the stretching according to the invention, first the reciprocal of the stretch factor is taken; here, 0.8 is the

TABLE 3

Load and Store Instruction Descriptions

| Instruction Type | Mnemonic Format | Description |
| --- | --- | --- |
| 16-Byte, 20-Bit Load | vldw vd, mem128 | Load destination register vd with 16 bytes of signed 16-bit data at address mem128. |
| 8-Byte, 20-Bit Load | vldw vdh, mem64 | Load slots 4 through 7 of destination register vd with 8 bytes of signed 16-bit data at address mem64. Set slots 0 through 3 of vd to zero. |
| 16-Byte, 10-Bit Load | vldb vd, mem128 | Load destination register vd with 16 bytes of unsigned 8-bit data at address mem128. Data is loaded using a 2:1 byte interleave pattern. |
| 16-Byte, 10-Bit Load | vldb vdh, mem64 | Load destination register vd with 8 bytes of unsigned 8-bit data at address mem64. The upper half of each slot receives the memory values; the lower half of each slot is set to zero. |
| 16-Byte, 20-Bit Store | vstw mem128, vs | Store source register vs to 16 bytes of signed 16-bit data address mem128. |
| 8-Byte, 20-Bit Store | vstw mem64, vsh | Store slots 4 through 7 of source register vs to 8 bytes of signed 16-bit dat at address mem64. |
| 16-Byte, 10-Bit Store | vstb mem128, vs | Store source register vs to 16 bytes of unsigned 8-bit data at address mem128. Data is stored using a 2:1 interleave pattern. |
| 16-Byte, 10-Bit Store | vstb mem64, vsh | Store source register vs to 8 bytes of unsigned 8-bit data at address mem64. The upper half of each slot is stored to memory; the lower half of each slot is ignored. |

The mnemonics for the vector instruction need to specify the operations to perform on each partition as well as the sources, destination and ORU routing. This is notated as follows:

{sbr sbr add add sbr add sbr add} word V3, V2, V1(37P3Z1N2)

This instruction performs adds and reverse subtracts. V3 is the destination; V2 is sourceA; V1 is sourceB. The slots for the operand specifier and the routing specifier are laid out in decreasing order from left to right.; slot 7 and 6 get sbr, slot 5 gets add, and so forth. The "word" symbol specifies that the instruction works on a 20-bit partitions. The routing specifier for sourceB is set for the following (the number after the points specify slot numbers):

dest.7 ←=—sourceA.7+sourceB.3
dest.6 ←=—sourceA.6+sourceB.7
dest.5 ←=sourceA.5+#1.0
dest.4 ←=sourceA.4+sourceB.3
dest.3 ←=—sourceA.3+#0.0
dest.2 ←=sourceA.2+sourceB.1 reciprocal of 1.25. Then, a series of interpolation values are calculated, with each successive interpolation value being the value of the previous interpolation value plus the reciprocal of the stretch factor. This is illustrated by a series of interpolation values 400, which each have both integer and fractional portions. The integer parts are denoted $I_n$, while the corresponding fractional parts are denoted $i_n$. The first interpolation value is 0.0, the next is 0.8, the next is 1.6, etc.

To calculate each destination pixel, the integer portion of the interpolation value $I_n$, is used to determine the first source pixel, while the fractional portion $i_n$ is used to determine a weighing factor between the first source pixel and its next succeeding source pixel. This is illustrated by a series of equations 402, 404, and 406. Referring first to equation 402, the value of the pixel $P_0'$ is calculated. First, the source pixel $P_n$ is chosen according to the value of $I_1$. Here, the initial interpolation value $I_1$ is zero, so this indicates that the first destination pixel is to be generated from the weighted average of $P_0$ and the next pixel, $P_1$. $P_0$ (that is, $P_{I1}$) is first multiplied by $1-i_1$. In this case, $i_1$, is zero, indicating that the weighing is to be totally towards the first pixel. This results in $P_0'$ being set equal to the value of $P_0$, with no weighing of $P_1$ being added.

Turning to equation 404, the interpolation value for the second destination pixel $P_1'$ is found in $I_2$ and $i_2I_2$ is zero, indicating again that the weighing is to be determined between pixel $P_0$ and $P_1$. The weighing factor $i_2$, is 0.8, indicating that the pixel $P'_1$ should be the weighted combination of $0.8(P_1)+0.2(P_0)$.

Figure 6:
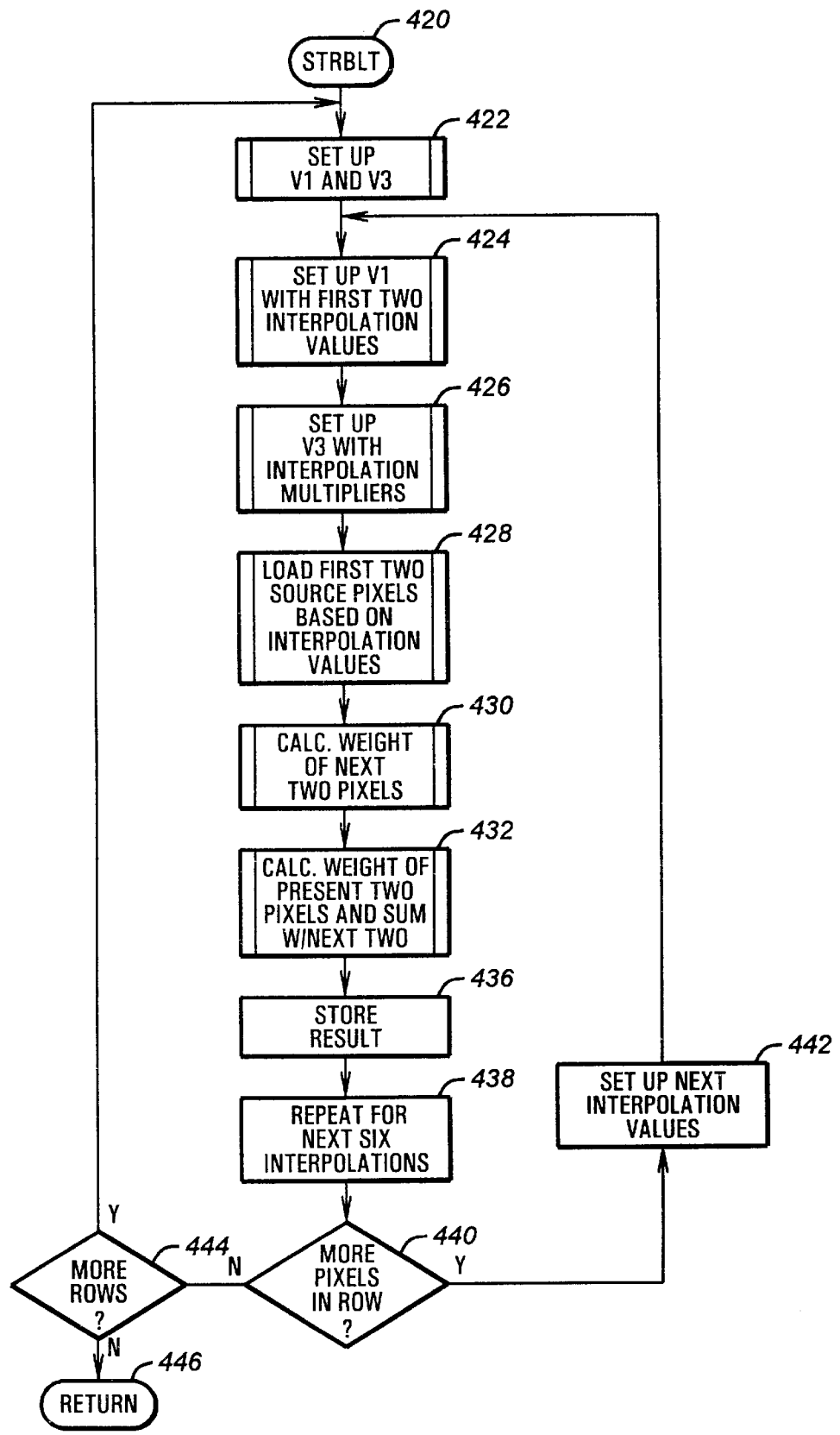
FIG. 6 is a flowchart illustration of a routine for generating eight successive stretched pixels using parallel processing according to the invention.

Equation 406 illustrates the next interpolation between initial pixels $P_1$ and $P_2$, yielding a pixel $P'_2$. In equation 406, the integral portion $I_3$ of the interpolation value is one, indicating $P_1$, rather than $P_0$, is the first pixel, while $P_2$ is the second pixel between which the value of $P'_2$ should be interpolated. The fractional portion $i_3$ is 0.6, indicating 0.6 $(P_2)+0.4$ $(P_1)$ will yield the weighted interpolation of pixel $P_2'$. Turning to FIG. 6, a flowchart is shown illustrating a STRBLT routine 420 for implementation on the multimedia extension unit 320 for parallel determination of new pixels relative to source pixels in a stretch blt algorithm. Of note, this routine only stretches in the horizontal direction (the more difficult direction). To stretch in the vertical direction, a similar technique is provided, but the interpolations are between entire rows of pixels rather than two adjacent pixels. As an overview, a routine STRBLT 420 calculates two 32-bit destination pixels at a time by loading two source pixels for each of the destination pixel and "weighing" the source pixels by their respective fractional portion of the interpolation values, and then adding the weighted values. The interpolation values are determined by taking the reciprocal of the stretch factor. In the attached source code appendix, a stretch factor of 1.455 is assumed. The reciprocal results in an interpolation value of 0.687, with each destination pixel $P'$ having a corresponding interpolation value. The first interpolation value is zero, the second is the reciprocal of the stretch factor, the third is two times the reciprocal of the stretch factor, etc. The routine 420 first establishes eight interpolation values, calculates the first eight destination pixels, and generates the next eight interpolation values by adding 8 times the reciprocal of the stretch factor to each of the original eight values. The reciprocal of the stretch factor is labeled the "$\Delta$d" value. At some point, the integer portion of the interpolation values will overflow, so they would have to be scaled down by subtracting out an integral amount. Although not illustrated, this step will be understood by one of ordinary skill in the art.

The STRBLT routine 420 begins at step 422, where vector registers V1 and V3 are set up. This is performed by a series of instructions 500–508, illustrated in FIGS. 7A–7B. At the end of this series of instructions, V1 contains eight interpolation values, designated as a vector V_INTERP [7 . . . 0]. These values progress from zero to 7$\Delta$d inncrements of $\Delta$d. V3 is set up principally with 8$\Delta$d V3.2 (slot 2 of V3). 8$\Delta$d is an interpolation multiplier INTERP_MULT, which is added to each of the interpolation values in V_INTERP[7 . . . 0] after each 8 new pixels have been calculated.

Figure 9:
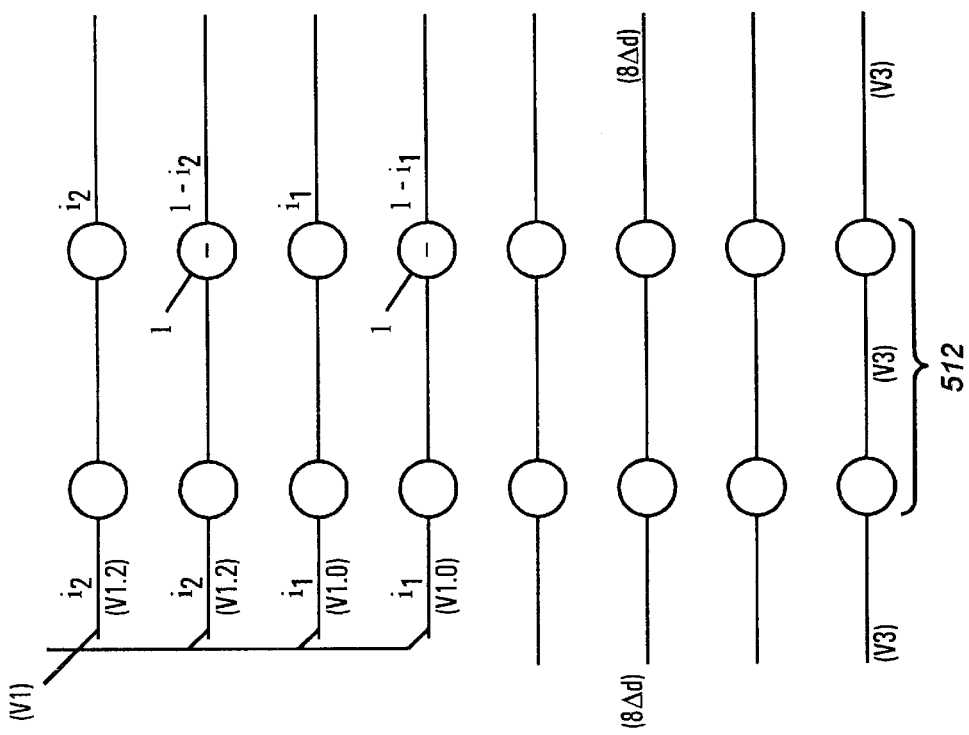
FIG. 9 is a diagram illustrating the parallel instruction flow used to generate interpolation values in the routine of FIG. 6.

Proceeding to step 424, the interpolation vector V_INTERP[7 . . . 0] is stored to memory, and the first two fractional interpolation values are loaded in V1. That is, the fractional portions of $i_1$ and $i_2$ are loaded into V1 from the interpolation values stored to memory. This is further discussed below in conjunction with FIG. 8. Proceeding to step 426, the top four slots of V3 are loaded with the appropriate interpolation multipliers. The interpolation values were previously loaded into the high order portion of V1 in step 424. These are then manipulated to yield the appropriate weighing multipliers for each first and subsequent source pixels that correspond to each of the two destination pixels being generated on this pass. This is further discussed below in conjunction with FIG. 9.

Figure 10A:
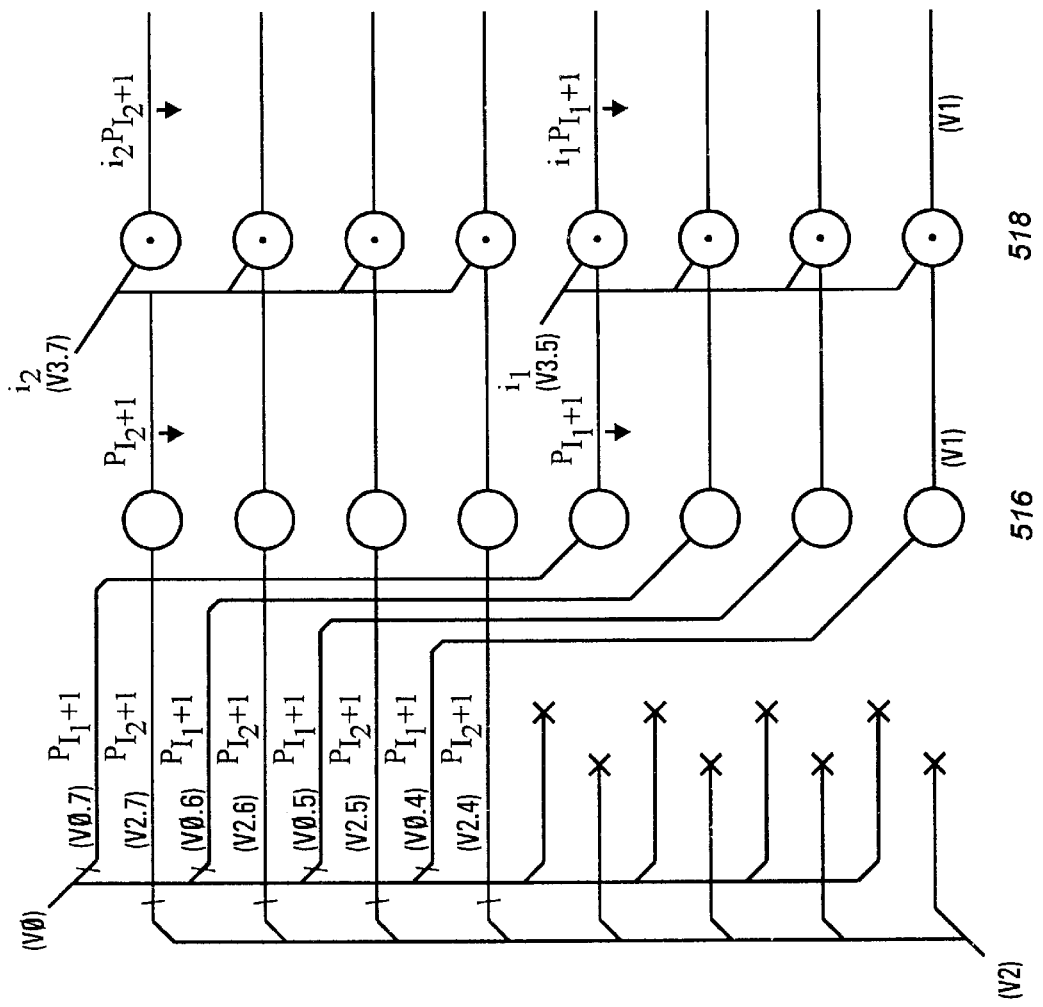
FIGS. 10A–10B are diagrams illustrating the parallel instruction flow and routing used to create weighted interpolated pixel values in the routine of FIG. 6.

Proceeding to step 428, the two sets of first and subsequent source pixels for destination pixels are loaded based on the integer portion of the interpolation value. This corresponds to four source pixels, two for each destination pixel. Proceeding to step 430, the weight of the two subsequent source pixels are calculated, and then at step 432, the weight of the first two source pixels are calculated and summed with the weight of the two subsequent source pixels. The resulting two destination pixels are then stored at step 436. This is all further discussed below in conjunction with FIGS. 10A–10B.

Proceeding to step 438, the sequence of 424–436 is repeated for the next six interpolation values. The difference in the subsequent loops is principally that the different fractional and integral portions of the interpolation values are used for each subsequent two pixels. That is, the second two pixels are calculated based on $I_4$, $i_4$, $I_3$, and $i_3$, the next two based on $I_6$, $i_6$, $I_5$, $i_5$, and the last two pixels are calculated based on $I_8$, $i_8$, $I_7$, $i_7$.

At step 440, it is determined whether more destination pixels must be calculated for a row. If so, control proceeds to step 442, where the next interpolation values are set up by adding INTERP_MULT (that is 8×$\Delta$d) to each of the interpolation values in the interpolation vector V_INTERP[7 . . . 0]. If at step 440 all of the pixels in the present row have been calculated, control proceeds to step 444, where it is determined whether more rows remain to be stretched. If so, the pointer is set to the start of the next row, and control loops to step 422, where V1 and V3 are again set up to their initial interpolation values. If more rows do not remain at step 444, the routine returns at step 446. Alternatively, before step 446, the rows can be vertically stretched as well by interpolating between rows.

Figure 7A:
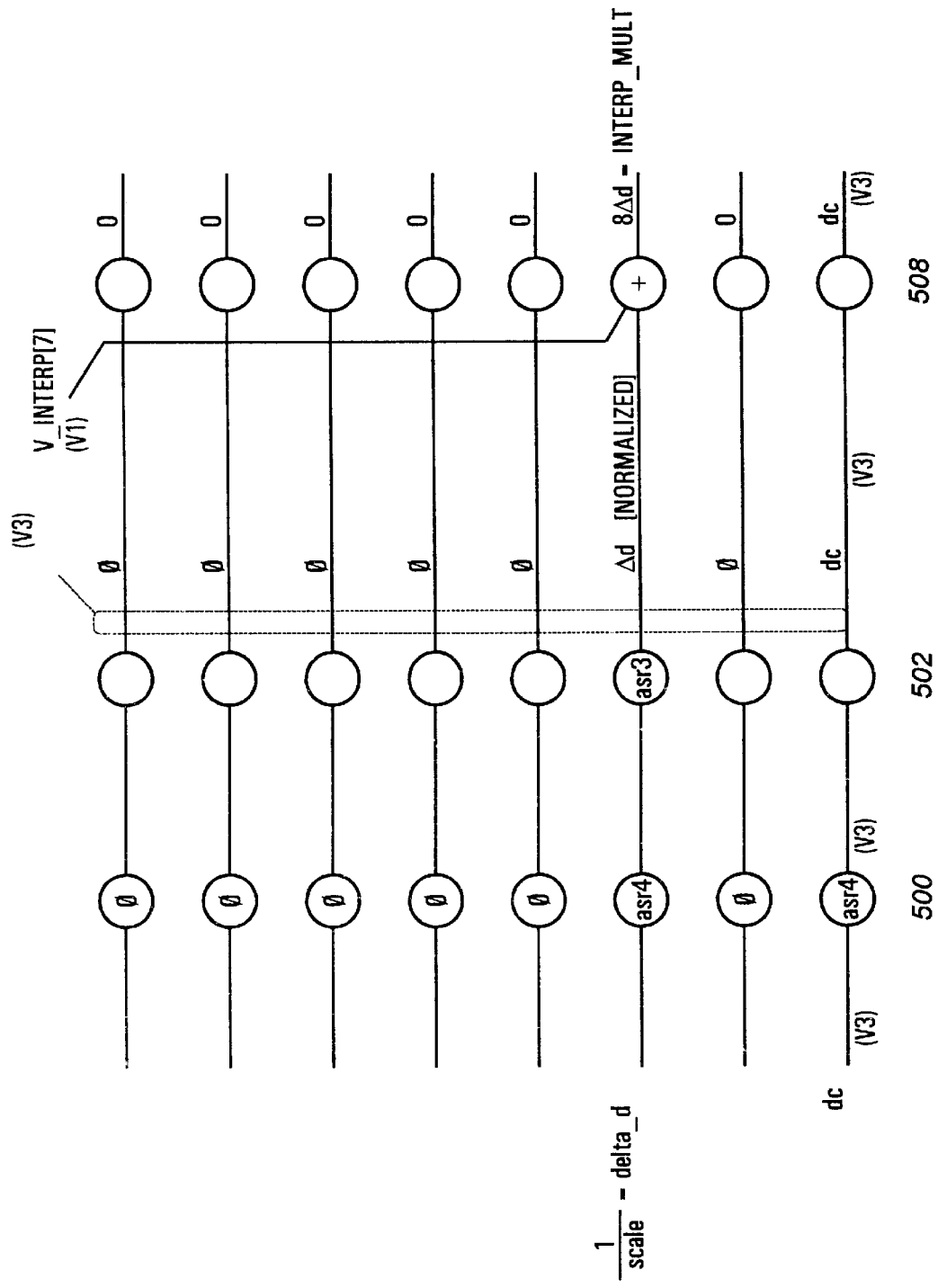
FIGS. 7A–7B are diagrams illustrating parallel instruction flow used to set up initial interpolation values in the routine of FIG. 6.
Figure 7B:
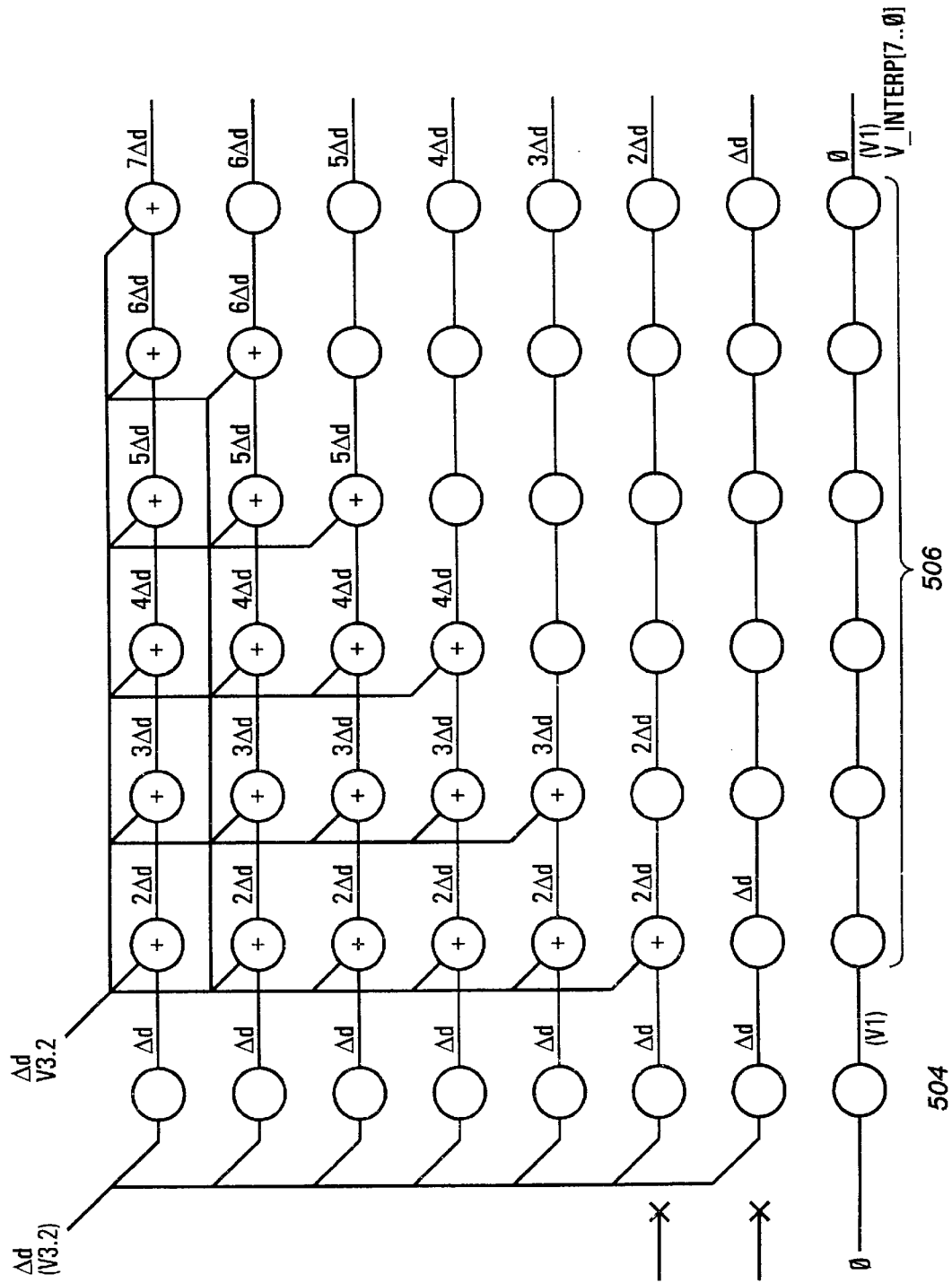

Turning to FIGS. 7A and 7B, the parallel instructions for setting up the vector registers V1 and V3 are graphically illustrated. These instructions are performed at step 422 of FIG. 6. As is earlier described, the multimedia extension unit 320 includes vectors that contain 20 bits of internal precision per slot, which corresponds to 16 bits per slot of external storage. This can be accessed in a word format, or in two split 10 bit half-word formats in which a byte of 8 bits is written to or read from each slot. According to the invention, the integer portion of each interpolation value is aligned with the upper half of the slot, while the fractional portion is aligned with the lower half of the slot. This leads to greater efficiency and simplicity in the execution of the routine.

As a first step, a delta_d value is calculated to be one over the stretch factor, or the scale. This is illustrated in FIG. 7A, in which vector slot V3.2 contains delta_d, the unscaled reciprocal of the stretch factor. This is arithmetically shifted right in instruction 500 by four bits, and then arithmetically shifted right by three bits in step 502, yielding a scaled, or normalized, reciprocal stretch factor $\Delta$d. This is contained in V3.2, step 502, and turning to FIG. 7B, is used in instruction 504 where $\Delta$d from vector slot V3.2 is simultaneously loaded into the top seven slots of vector V1. This results in $\Delta$d being in the top seven slots of V1, with a zero value being contained in slot V1.0. A series of instructions 506 are then performed that create the interpolation of vector V_INTERP[7 . . . 0]. Specifically, the six high order slots of V1 have added to them the scaler $\Delta$d from V3.2, yielding 2$\Delta$d in each of the six high order slots. Then, the five high order slots of V1 are added to $\Delta$d, yielding 3$\Delta$d, etc., until at the end of the sequence of instructions 506, V1 contains a series of successive integral multiples of $\Delta$d. Because of appropriate scaling, the integral portion of Δd is contained in the high order half of V1, while the fractional portion is contained in the low order half.

After V3.2 has been used for addition to V1 to create V_INTERP[7 . . . 0], V1.7, or V_INTERP[7] is added to V3.2 at instruction 508, yielding the interpolation multiplier INTERP_MULT, which equals 8Δd. As discussed previously, this will ultimately be added to each of the slots of V1 yielding the next series of interpolation values.

Turning to FIG. 8, as discussed above, the integral and fractional portions of each interpolation value are stored in a 20-bit slot, with a 10-bit high order portion containing the integral value and the adjacent 10-bit low portion containing a fractional portion. This is illustrated in FIG. 8, where the contents of the vector V1 are illustrated at times 509 and 510. At time 509, V1 contains the first eight interpolation values in its 20-bit slots, with an integral integer portion $I_n$ adjacent to each fractional portion $i_n$. This is then stored to memory, and then read from memory using a byte load instruction yielding the vector V1 at time 510. The low order portion of each slot of V1 then contains zero, while the high order portions contains $i_1$, $I_1$, $i_2$, $I_2$, etc. These interpolation values are then used to generate the first two scale factors through a series of instructions 512 illustrated in FIG. 9. The instructions 512 first route the fractional portion $i_1$ of the first interpolation value to the fourth and fifth slots of V3 and the fractional portion $i_2$ to the sixth and seventh slots of V3. Then, the fourth and sixth slots are subtracted from one, yielding the upper four slots of V3 containing $\{i_2, 1-i_2, i_1, 1-i_1\}$. The fourth and fifth slots contain the weighing factors that will yield the first destination pixel to be calculated, while the sixth and seventh slots contain the weighing factors to yield the second destination pixel.

Then, with the appropriate weighing factors calculated, the pixels with which the weighing factors must be multiplied are loaded. These are the pixels illustrated in FIG. 5. Turning back to FIG. 8, illustrated are the vectors V0 and V2 at a time 514. The upper portion of the four least significant slots of V0 have been loaded with the 32-bit pixel $P_{f1}$. That is, the integral value $I_1$ is used to map to the first pixel that will be used for interpolation. The upper four slots are loaded with $P_{f1+1}$, which is the next adjacent pixel to the first integral pixel $P_{f1}$. Similarly, V2 is loaded with $P_{f2}$ and $P_{f2+1}$.

Figure 10B:
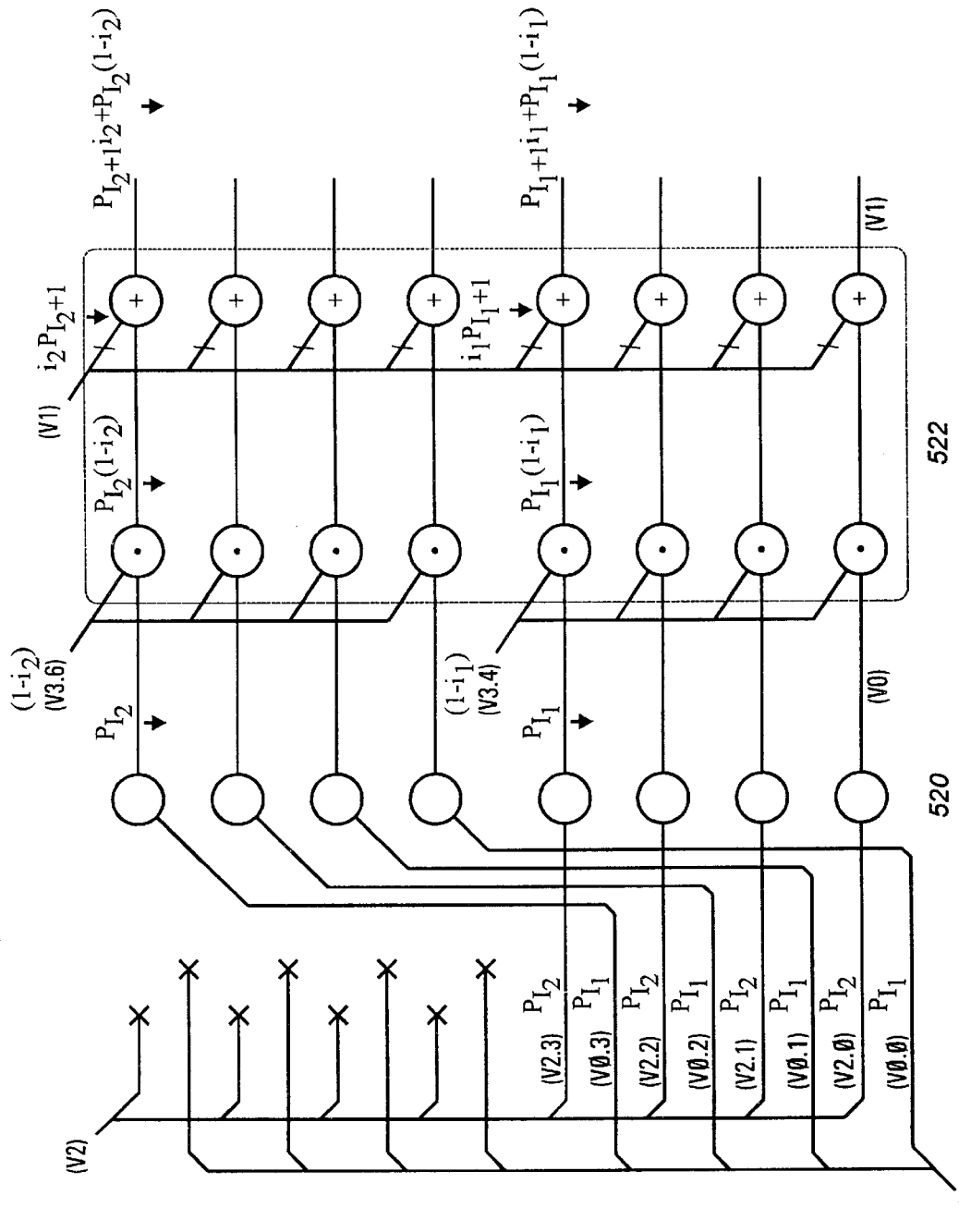

The pixels stored in V0 will then be weighted with $i_1$ and $1-i_1$ as held in V3, and the pixels held in V2 will be weighted with $i_2$ and $1-i_2$. This is achieved by instructions illustrated in FIGS. 10A and 10B. First, $P_{f1+1}$ and $P_{f2+1}$ are routed from V0 and V2 into V1 in an instruction 516. The upper four slots of V1 then contain $P_{f2+1}$, while the lower four slots contain $P_{f1+1}$. These pixels must then be weighted by the interpolation values $i_2$ and $i_1$. This is accomplished in step 518, yielding V1 containing $P_{f2+1} \cdot i_2$ and $P_{f1+1} \cdot i_1$. Referring back to FIG. 5, it is understood in reference to the calculation of P'$_0$ and P'$_1$, that this is half of the calculation necessary to yield those two destination pixels. Referring to FIG. 10B, $P_{f2}$ and $P_{f1}$ are routed from V0 and V2 into V0, yielding $P_{f2}$ in the top four slots and $P_{f1}$ in the bottom four slots. These two pixels are then simultaneously weighted and added to their previously weighted successive pixels $P_{f2+1}$ and $P_{f1+1}$ by a multiply and accumulate instruction illustrated as 522. Then, $1-i_2$, found in V3.6, is multiplied by $P_{f2}$, and $1-i_1$, located in V3.4, is multiplied by $P_{f1}$. These values are then added to $i_2P_{f2+1}$ and $i_1P_{f1+1}$ to yield:

$$P'_1 = P_{f2+1}(i_2) + P_{f2}(1-i_2)$$

and $$P'_0 = P_{f1+1}(i_1) + P_{f1}(1-i_1)$$

Thus, using operand routing and selectable operations per slot, two 32-bit destination pixel values have been simultaneously generated based on four source pixel values and two interpolation values. These values are then stored, as previously discussed, in conjunction with step 436.

It will be appreciated that the next six pixels are calculated by similar instructions illustrated in FIGS. 8–10B. These instructions are designed as instructions 524, 526, and 528 in the source code appendix. For the next two pixels, rather than $i_1$ and $i_2$ being routed by instructions 512 in FIG. 9 and $P_{f1}$ and $P_{f2}$ being loaded in step 514 in FIG. 8, $i_3$ and $i_4$, and the corresponding pixels $P_{f3}$ and $P_{f4}$ are loaded along with the succeeding pixels $P_{f3+1}$ and $P_{f4+1}$. For the final four values, effectively the same sequence is repeated, but in contrast to at time 510, V1 in its high order slots contains $I_8, i_8 \ldots I_5, i_5$. After all eight values have been generated, at step 442 the next interpolation values are generated.

Figure 11:
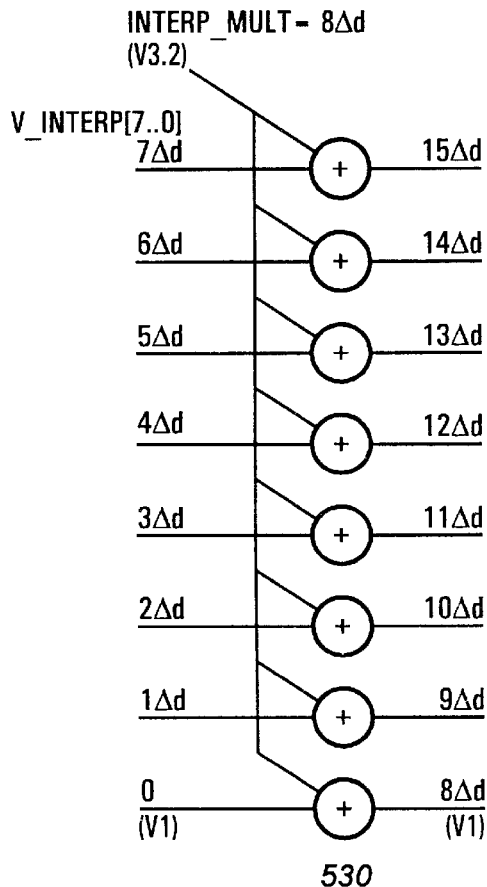
FIG. 11 is a diagram illustrating the parallel instruction flow used to generate succeeding interpolation values for the routine of FIG. 6.

Turning to FIG. 11, shown is the parallel instruction executed to set up the next interpolation values in step 442. Instruction 530 adds the scaler INTERP_MULT, which is equal to 8Δd, to each slot of the vector V_INTERP[7 . . . 0], held in vector register V1. This results in each interpolation value being incremented by 8Δd, yielding the next eight interpolation values.

Figure 12:
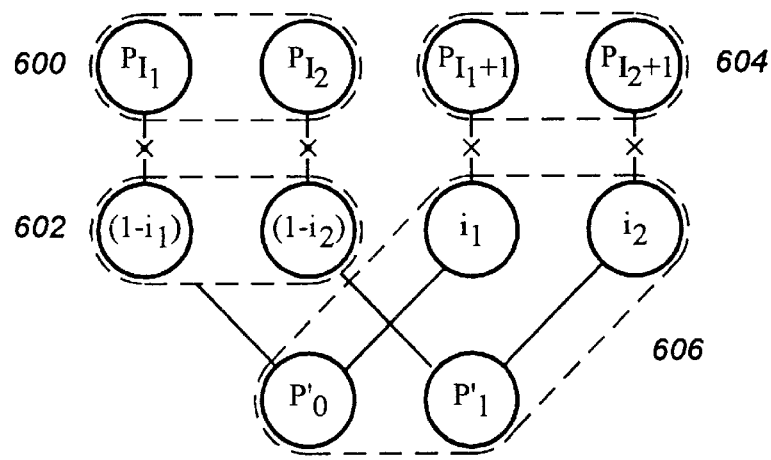
FIG. 12 is a block diagram illustrating the parallel instruction flow used to create two pixels based on four interpolated and weighted source pixels.

Finally, turning to FIG. 12, shown is a diagram illustrating the parallel generation of two interpolated 32-bit pixels according to the invention. As discussed above in conjunction with FIGS. 5–11, a step 600 shows two pixels $P_{f1}$ and $P_{f2}$ being simultaneously loaded. Then at step 602 these pixels are simultaneously weighted with $1-i_1$ and $1-i_2$. Then, at step 604, the next successive two pixels $P_{f1+1}$ and $P_{f2+1}$ are simultaneously loaded, and then weighted by $i_1$ and $i_2$ at step 606. Simultaneously, however, these weighted successive pixels are added to the original weighted pixels $P_{f1}$ and $P_{f2}$, yielding P'$_0$ and P'$_1$. That is, step 606 takes place in forming a multiply and accumulate instruction. Thus, using the operand routing and selectable operations per slot in a multimedia extension unit 132, yields a highly efficient method of performing a stretch of a pixel map.

Figure 13:
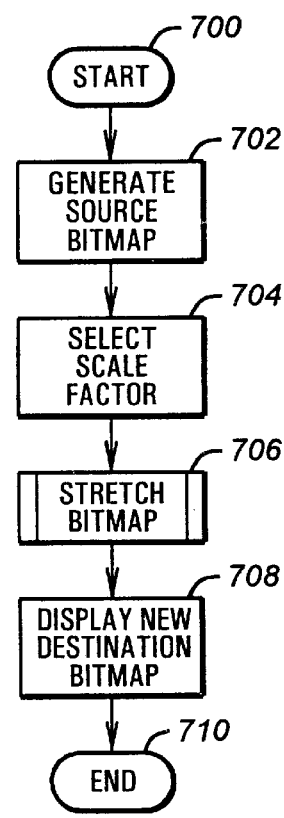
FIG. 13 is a flowchart illustration of how the bit map stretching would be employed in a video system according to the invention.

Turning to FIG. 13, shown is a flowchart illustration of how the bit map stretching could be employed according to the invention. Beginning at step 700, the routine of FIG. 13 proceeds to step 702, where a source bit map is generated. Then, proceeding to step 704, a scale factor is selected. This could be performed, for example, in response to a user resizing a window in a graphical operating system. The scale factor could even be different in the horizontal and vertical directions. Proceeding to step 706, the bit map is stretched based on the scale factor provided in step 704. This is performed by executing the STRBLT routine 420, or some similar routine, dependent on the format of the bit map. Proceeding to step 708, the stretch bit map is displayed on the video screen. The routine then ends at step 710. This routine 700, or the STRBLT routine 420, would preferably be stored either as part of the operating system on hard disk or other readable media, or as part of an embedded read only memory toolbox.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

```
.386p
MODEL MEDIUM
;Stretch Blt Algorithm                                    Brian Longhenry
;December 8, 1995
;
;Disclaimer:  This algorithm was blindly written for moving pixel values of
;32 bits.   Obviously, a change in pixel storage size would require a
touching
;up of references to memory locations of pixels in this algorithm and
;miscellaneous other things.  It also assumes that only stretching is going
;on here, not shrinking (a fair assumption for a "Stretch Blt Algorithm").
;If shrinking of the source is desired, modifications would be needed.
;Finally, this algorithm (in its current state) only stretches in the
;horizontal direction.  This is truly the more difficult of the two
;dimensions to stretch.  If popular opinion warrants, I could easily be
;talked into adding a little bit for vertical stretching also.
;
;
;
;This algorithm calculates two 32-bit destination pixels at a time by
;loading one source pixel for each of the two destination pixels side by
;side in half a vector register and multiplying them by their respective
;interpolation values.  This is repeated with the second source pixels for
;each of the two destination pixels and the results are added together to
;create two destination pixels which are located side by side in half a
;vector register, which eases storing of the destination pixels out to
;memory.
;
;The key to this algorithm is taking the reciprocal of the stretch factor
;(ie. a 45.5% blowup yields a stretch factor of 1.455), and adding this
;value to zero seven times to get 8 interpolation values which can be used
;to determine not only the ratios of the source pixels needed for
;interpolation, but also which source pixels are needed for interpolation
;of each destination pixel.  For example, for a blowup of 45.5%, the stretch
;factor would be 1.455 and the reciprocal would be .687.  The first eight
;interpolation slots to calculate the first eight destination pixels would
;be:
;
; 0.000   0.687   1.375   2.062   2.749   3.436   4.124   4.811
;   ^   ^                   ^   ^
;   |   |                   |   |
;   a   b                   c   d
;
;The integer value of every slot determines which two source pixels this
;slot is to interpolate between.  The interpolation for that slot is always
;between the source pixel indicated by the integer value and the next one
;up after that.  For example, in the first slot, the interpolation will be
;between source pixels 0 and 1 (a).  In the fourth slot, the interpolation
;will be between source pixels 2 and 3 (c).
;
;The fractional value of every slot determines the percentage of the two
;source pixels needed to calculate the destination pixel.  The fraction
;listed is multiplied by the second source pixel and the inverse of the
;fraction is multiplied by the first source pixel.  Those two resultants
;are added to yield the destination pixel for that slot.  For example, in
;the first slot, 0% of source pixel 1 is added to 100% of source pixel 0
;to yield the first destination pixel (b).  In the fourth slot, 6.2% of
;source pixel 3 is added to 93.8% of source pixel 2 to yield the fourth
;destination pixel (d).
;
;When the first eight destination pixels have been determined, the next
;eight interpolation slots are found by adding the interpolation delta value
;to all eight slots.  The interpolation delta value can be found by
;multiplying the initial stretch factor reciprocal value by 8 (In this
;example, the delta value would be 8 x 0.687 = 5.498).  For example, the
;next eight interpolation slots after the first eight slots above would be
```

```
;
; 5.498  6.186  6.873  7.560  8.247  8.935  9.622  10.309
;
;These would then be used to determine the following eight destination
;pixels.  This process would be continued until an entire horizontal line
;had been expanded, at which time you would go on to the next line up and
;start over.
;
;-----
;
;stretch amount = unlimited
;scale or stretch factor = scaling value of stretch (ie. a 45.5% blowup
; yields a scale or stretch factor of 1.455)
;delta d = 8 x reciprocal of stretch factor
;
;***************************** SETUP **********************************
;Setup:  The first thing to do to setup this algorithm is to find the
;reciprocal of the scale of the stretch (ie. a 45.5% blowup yields a scale
;of 1.455, and a reciprocal of 1/1.455 = .687).  Then, the value of
;8 x this reciprocal value needs to be found and stored as delta d below.
;
;Another thing that must be handled in preparation for this loop is that the
;interpolation values and the delta interpolation value (delta d) must be
;shifted right so that the decimal point falls between two memory locations
;when a full vector store is done.  If the interpolation value was loaded
as
;a word value, this would require a shift right of seven bits.  This also
;means that the largest integer value that can be stored must be held in
;seven bits.  Therefore, special arrangements must be made to make sure that
;if the source graphical element being moved is greater than 128 pixels
;across, then esi can be incremented by 128 and the integer portions of the
;interpolation values can be reset if the integer portion of the
;interpolation values ever reaches its limit.
;**********************************************************************
;
; Assume v1 = {d8,d7,d6,d5,d4,d3,d2,d1} (interpolation values (word values))
; Assume v3 = {Reserved 1 (R1),R2,R3,R4,Don't Care (DC),
;              delta d(scaled by 128),DC,0000000001111111111}
;
;----------------------------------------------------------------------
;
        include sbMEUDEF.INC public      _StrBlt _TEXT   segment use32

_StrBlt     proc    near mov     esi,0041f000h
        mov     edi,0041f100h
        mov     ebp,0041f300h ;** Begin setup section for this test ** mov     word ptr [ebp],03ffh    ; This is to setup the mask in slot 0 (This
                                        ;   may not be needed anymore)
        mov     word ptr [ebp + 4],5000h ; This is to setup delta d in slot 2(.625)
                                        ;  This yields a scaleup of 1.6 from the
original
        vldw    v3,[ebp]                ; We only care what slots 0 and 2 are
500     {movb movb movb movb movb asr4 movb asr4}word v3,v3,v3(zzzzz2z0)
502     {movb movb movb movb movb asr3 movb movb}word v3,v3,v3(76543210)
504     {movb movb movb movb movb movb movb movb}word v1,v3,v3(2222222z)
```

```
      ⎧{add   add   add   add   add   add   acum  acum}word v1,v1,v3(222222zz)
      ⎪{add   add   add   add   add   acum  acum  acum}word v1,v1,v3(22222zzz)
      ⎪{add   add   add   add   acum  acum  acum  acum}word v1,v1,v3(2222zzzz)
  506 ⎨{add   add   add   acum  acum  acum  acum  acum}word v1,v1,v3(222zzzzz)
      ⎪{add   add   acum  acum  acum  acum  acum  acum}word v1,v1,v3(22zzzzzz)
      ⎪{add   acum  acum  acum  acum  acum  acum  acum}word v1,v1,v3(2zzzzzzz)
  508  {acum  acum  acum  acum  acum  add   acum  acum}word v3,v3,v1(zzzzz7zz)
       ; v1 and v3 are now set for loop according to assumptions above mov    [esi],01010101h
       mov    [esi + 4],02020202h
       mov    [esi + 8],03030303h
       mov    [esi + 12],04040404h
       mov    [esi + 16],05050505h
       mov    [esi + 20],06060606h
       mov    [esi + 24],07070707h
       mov    [esi + 28],08080808h
       mov    [esi + 32],09090909h
       mov    [esi + 36],0a0a0a0ah
       mov    [esi + 40],0b0b0b0bh
       mov    [esi + 44],0c0c0c0ch
       mov    [esi + 48],0d0d0d0dh
       mov    [esi + 52],0e0e0e0eh
       mov    [esi + 56],0f0f0f0fh
       mov    [esi + 60],10101010h
       mov    [esi + 64],11111111h
       mov    [esi + 68],12121212h
       mov    [esi + 72],13131313h
       mov    [esi + 76],14141414h
       mov    [esi + 80],15151515h
       mov    [esi + 84],16161616h
       mov    [esi + 88],17171717h
       mov    [esi + 92],18181818h
       mov    [esi + 96],19191919h
       mov    [esi + 100],1a1a1a1ah
       mov    [esi + 104],1b1b1b1bh
       mov    [esi + 108],1c1c1c1ch
       mov    [esi + 112],1d1d1d1dh
       mov    [esi + 116],1e1e1e1eh
       mov    [esi + 120],1f1f1f1fh
       mov    [esi + 124],20202020h
       mov    [esi + 128],21212121h
       mov    [esi + 132],22222222h
       mov    [esi + 136],23232323h
       mov    [esi + 140],24242424h
       mov    [esi + 144],25252525h
       mov    [esi + 148],26262626h
       mov    [esi + 152],27272727h
       mov    [esi + 156],28282828h mov    ecx,65
       push   edi
    ediclearloop:
       mov    dword ptr [edi],00000000h
       add    edi,4
       loop   ediclearloop
       pop    edi mov    ecx,8
       xor    eax,eax               ; zero out eax and ebx for future memory
       xor    ebx,ebx               ;   calculation purposes ;*****************************************************
    ;** End of setup section...Begin StretchBLT Loop **
    ;*****************************************************
```

24

```
        StrBltLoop:
            ; v1 already contains current set of interpolation values for this loop
  509 → vstw    [ebp], v1
                            ; v1h contains the integer part of the interpolation
                            ; values from which the source pixels to use are
                            ; determined. v1l contains the fraction part of
                            ; the interpolation values which determine the
                            ; actual interpolation ratios to multiply by.

510 → vldb    v1h,[ebp]
        ; v1h = {x,x,x,x,x,i2,x,i1};
  512 ⎰{movb movb movb movb acum acum acum acum}byte v3,v1,v1(2200zzzz)
       ⎱{acum sbr  acum sbr  acum acum acum acum}byte v3,v3,v3(zpzpzzzz)
        ; v3h = {i2,1-i2,i1,1-i1,....} mov     al,[ebp + 1]      ; load two source pixels for interpolation of
        vldb    v0h,[esi + eax * 4];  first destination pixel
        ; v0h = {(source 1 "B" pixel),(source 1 "A" pixel)}
        mov     bl,[ebp + 3]      ; load two source pixels for interpolation of
        vldb    v2h,[esi + ebx * 4];  second destination pixel
  514 → ; v2h = {(source 2 "B" pixel),(source 2 "A" pixel)}

516   {mova mova mova mova movb movb movb movb}byte v1,v2,v0(zzzz7654)
        ; v1h = {(source 2 "B" pixel),(source 1 "B" pixel)}

518   {mul  mul  mul  mul  mul  mul  mul  mul }byte v1,v1,v3(77775555)
        ; multiply interpolation values by "B" source pixel values 520   {movb movb movb movb acum acum acum acum}byte v0,v0,v2(3210zzzz)
        ; v0h = {(source 2 "A" pixel),(source 1 "A" pixel)}

522   {mac  mac  mac  mac  mac  mac  mac  mac }byte v1,v0,v3(66664444)
        ; multiply inverse interpolation values by "A" source pixel values
        ; v1h = {(dest 2 pixel),(dest 1 pixel)} vstb    [edi], v1h
                            ; store first two destination pixels (32 bit pixels)

;-----

⎧vldb    v2h,[ebp]
       ⎪; v2h = {x,i4,x,i3,x,x,x,x}
  524 ⎨{movb movb movb movb acum acum acum acum}byte v3,v2,v2(6644zzzz)
       ⎪{acum sbr  acum sbr  acum acum acum acum}byte v3,v3,v3(zpzpzzzz)
       ⎩; v3h = {i4,1-i4,i3,1-i3,....} mov     al,[ebp + 5]
        vldb    v0h,[esi + eax * 4]
        ; v0h = {(source 3 "B" pixel),(source 3 "A" pixel)}
        mov     bl,[ebp + 7]
        vldb    v1h,[esi + ebx * 4]
        ; v1h = {(source 4 "B" pixel),(source 4 "A" pixel)}

{mova mova mova mova movb movb movb movb}byte v2,v1,v0(zzzz7654)
        ; v2h = {(source 4 "B" pixel),(source 3 "B" pixel)}

{mul  mul  mul  mul  mul  mul  mul  mul }byte v2,v2,v3(77775555)

{movb movb movb movb acum acum acum acum}byte v0,v0,v1(3210zzzz)
        ; v0h = {(source 4 "A" pixel),(source 3 "A" pixel)}

{mac  mac  mac  mac  mac  mac  mac  mac }byte v2,v0,v3(66664444)
        ; v2h = {(dest 4 pixel),(dest 3 pixel)} vstb    [edi + 8], v2h
```

```
      ;-----
      ⎛vldb  v1h,[ebp + 4]
      ⎜; v1h = {x,i6,x,i5,x,x,x,x}
 526 ⎨{movb movb movb movb acum acum acum acum}byte v3,v1,v1(6644zzzz)
      ⎜{acum sbr  acum sbr  acum acum acum acum}byte v3,v3,v3(zpzpzzzz)
      ⎝; v3h = {i6,1-i6,i5,1-i5,....} mov   al,[ebp + 9]
       vldb  v0h,[esi + eax * 4]
       ; v0h = {(source 5 "B" pixel),(source 5 "A" pixel)}
       mov   bl,[ebp + 11]
       vldb  v2h,[esi + ebx * 4]
       ; v2h = {(source 6 "B" pixel),(source 6 "A" pixel)}

{mova mova mova mova movb movb movb movb}byte v1,v2,v0(zzzz7654)
       ; v1h = {(source 6 "B" pixel),(source 5 "B" pixel)}

{mul  mul  mul  mul  mul  mul  mul  mul}byte v1,v1,v3(77775555)

{movb movb movb movb acum acum acum acum}byte v0,v0,v2(3210zzzz)
       ; v0h = {(source 6 "A" pixel),(source 5 "A" pixel)}

{mac  mac  mac  mac  mac  mac  mac  mac}byte v1,v0,v3(66664444)
       ; v1h = {(dest 6 pixel),(dest 5 pixel)} vstb  [edi + 16], v1h

;-----
      ⎛vldb  v2h,[ebp + 8]
      ⎜; v2h = {x,i8,x,i7,x,x,x,x}
 528 ⎨{movb movb movb movb acum acum acum acum}byte v3,v2,v2(6644zzzz)
      ⎜{acum sbr  acum sbr  acum acum acum acum}byte v3,v3,v3(zpzpzzzz)
      ⎝; v3h = {i8,1-i8,i7,1-i7,....} mov   al,[ebp + 13]
       vldb  v0h,[esi + eax * 4]
       ; v0h = {(source 7 "B" pixel),(source 7 "A" pixel)}
       mov   bl,[ebp + 15]
       vldb  v1h,[esi + ebx * 4]
       ; v1h = {(source 8 "B" pixel),(source 8 "A" pixel)}

{mova mova mova mova movb movb movb movb}byte v2,v1,v0(zzzz7654)
       ; v2h = {(source 8 "B" pixel),(source 7 "B" pixel)}

{mul  mul  mul  mul  mul  mul  mul  mul}byte v2,v2,v3(77775555)

{movb movb movb movb acum acum acum acum}byte v0,v0,v1(3210zzzz)
       ; v0h = {(source 8 "A" pixel),(source 7 "A" pixel)}

{mac  mac  mac  mac  mac  mac  mac  mac}byte v2,v0,v3(66664444)
       ; v2h = {(dest 8 pixel),(dest 7 pixel)} vstb  [edi + 24], v2h vldw  v1,[ebp]       ; recall the interpolation values
       add   edi,32         ; set edi for next 8 destination pixel locations 530  {add  add  add  add  add  add  add  add}word v1,v1,v3(22222222)
       ; v1 now contains next set of interpolation values ;jump  StrBltLoop
       ;loop  StrBltLoop
       dec   ecx
       jnz   StrBltLoop
```

```
;(This code can be run optimally in 39 clocks, calculating 8 32-bit pixels)
;(This code can be decoded optimally in 36 clocks)
;(39 clocks/loop would result in a performance of 4 7/8 clk/32-bit pixel
; and 1 7/32 clk/8-bit pixel element)
;----------------------------------------------------------------

_StrBlt     endp

_TEXT ends end
```

What is claimed is:

1. A method of generating a stretched set of destination pixels from a set of source pixels in a computer system, the method comprising the steps of:
   providing a vector processing unit with vector operand routing and multiple operations per instruction;
   generating a series of interpolation values consisting of multiples of the reciprocal of a stretch factor;
   routing two source pixels and two successive source pixels into two vector registers;
   simultaneously weighting two of the two source pixels or two successive source pixels; and
   simultaneously weighting a second two of the two source pixels or two successive source pixels and adding to the previously weighted source pixels yielding two destination pixels.

2. The method of claim 1, further comprising the steps of:
   routing two of the series of interpolation values into a vector register; and
   creating weighting factors from the two of the series of interpolation values,
   wherein said step of simultaneously weighting use the weighting factors.

3. The method of claim 1, wherein the step of providing a vector processing unit further includes the step of providing vector registers with upper and lower portions of slots, and wherein the step of generating the interpolation values further includes the steps of
   normalizing the reciprocal of the scale factor so that an integer portion of an interpolation value falls in an upper portion of a slot and a fractional portion of an interpolation value falls in a lower portion of a slot.

4. The method of claim 3, wherein the step of generating the interpolation values further includes the steps of:
   adding in parallel the reciprocal of the scale factor to one of the slots of a vector register, then two of the slots of the vector register, up to a predetermined number of slots such that one slot contains 0, a second slot contains one times the reciprocal of the scale factor, and third slot contains two times the reciprocal of the scale factor, up to a desired number of interpolation values.

5. The method of claim 4, further comprising the steps of:
   after calculating a predetermined number of destination pixels, calculating a next series of interpolation values by adding a multiple of the reciprocal of the scale factor to the interpolation values.

6. The method of claim 1, further comprising the steps of:
   repeating the calculation of a predetermined number of destination pixels two at the time.

7. A computer system for calculating a stretched set of destination pixels from a set of source pixels, the system comprising:
   a vector processing unit with vector operand routing and multiple operations per instruction;
   means for generating a series of interpolation values consisting of multiples of the reciprocal of a stretch factor;
   means for routing two source pixels and two successive source pixels into two vector registers;
   means for simultaneously weighting two of the two source pixels or two successive source pixels; and
   means for simultaneously weighting a second two of the two source pixels or two successive source pixels and adding to the previously waited source pixels yielding two destination pixels.

8. A computer program product for controlling a vector processing unit, the program comprising:
   a computer readable medium;
   means on said computer readable medium for generating a series of interpolation values consisting of multiples of the reciprocal of a stretch factor;
   means for routing two source pixels and two successive source pixels into two vector registers;
   means for simultaneously weighting two of the two source pixels or two successive source pixels; and
   means for simultaneously weighting a second two of the two source pixels or two successive source pixels and adding to the previously waited source pixels yielding two destination pixels.

9. A system for generating a stretched set of destination pixels from a set of source pixels comprising:
   a processor;
   a multimedia extension unit coupled to the processor having operand routing and operation selection;
   a video system;
   a code segment for execution by said processor and said multimedia extension unit; said code segment including:
     code for providing a vector processing unit with vector operand routing and multiple operations per instruction;
     code for generating a series of interpolation values consisting of multiples of the reciprocal of a stretch factor;
     code for routing two source pixels and two successive source pixels into two vector registers;
     code for simultaneously weighting two of the two source pixels or two successive source pixels; and
     code for simultaneously weighting a second two of the two source pixels or two successive source pixels and adding to the previously weighted source pixels yielding two destination pixels.

* * * * *